United States Patent [19]

Hamilton et al.

[11] Patent Number: 4,635,883
[45] Date of Patent: Jan. 13, 1987

[54] AIRCRAFT CARGO LOADER

[75] Inventors: Herbert E. Hamilton, Edmonds; Thomas H. Shorey, Mill Creek, both of Wash.

[73] Assignee: The Boeing Company, Seattle, Wash.

[21] Appl. No.: 763,634

[22] Filed: Aug. 8, 1985

[51] Int. Cl.$^4$ .......................... B64C 1/22; B64D 9/00
[52] U.S. Cl. .................................. 244/137 R; 414/528
[58] Field of Search ............ 244/137 R, 137 P, 118.3, 244/129.5, 129.6; 414/347, 528, 532, 537, 921

[56] References Cited

U.S. PATENT DOCUMENTS 2,285,207 6/1942 Johnson ............................ 414/537
3,319,811 5/1967 Martin, Jr. ......................... 414/537

Primary Examiner—Sherman D. Basinger
Assistant Examiner—Rodney Corl
Attorney, Agent, or Firm—Christensen, O'Connor, Johnson & Kindness

[57] ABSTRACT

Disclosed is an aircraft cargo loader that is folded for stowage against the interior surface of an aircraft cargo door and is extended between the sill of the cargo door and the surface of the ground for loading and unloading baggage and other relatively small cargo items. The cargo loader includes an endless conveyor belt, with the cargo loader and the conveyor belt being configured so that the conveyor belt remains under relatively constant tension when cargo loaded is extended and when the cargo loader is folded for stowage. An L-shaped deployment track is attached to the upper end of the cargo loader and fastened between the cargo loader deck and ceiling when the cargo loader is deployed. The L-shaped deployment track facilitates cargo loader deployment and retraction in which the folded cargo loader is swung through the cargo opening while extending from the vertical leg of the deployment track; rotated to extend from the horizontal leg of the deployment track; and, while extending from the horizontal leg, folded or unfolded. Both power and manual drives are included for moving the cargo loader along the L-shaped deployment track; for folding and unfolding the cargo loader; for locking the cargo loader in the extended, deployed position; and for extending and retracting a ground support assembly that supports the lower end of the cargo loader above the surface of the ground.

18 Claims, 38 Drawing Figures

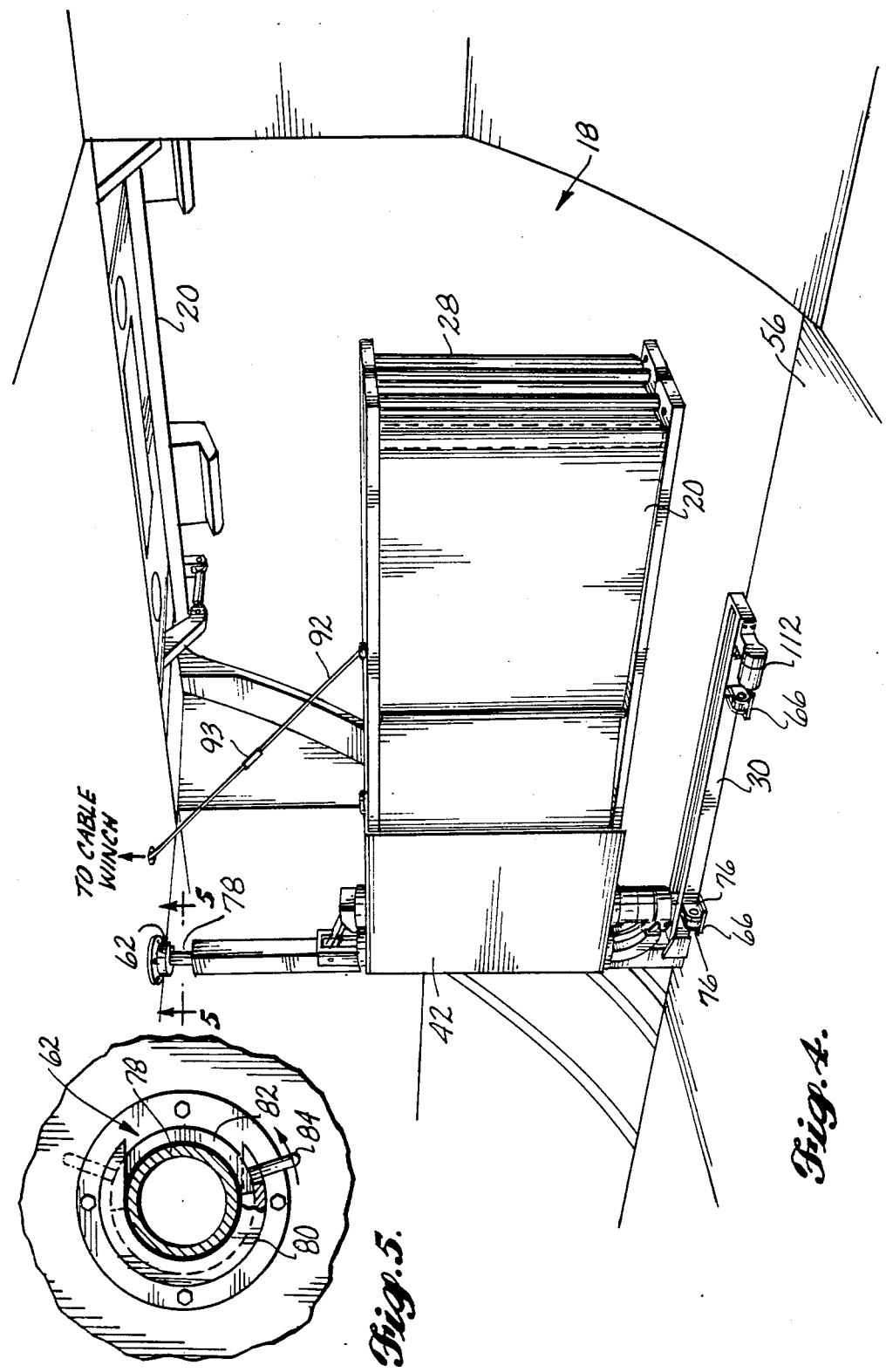

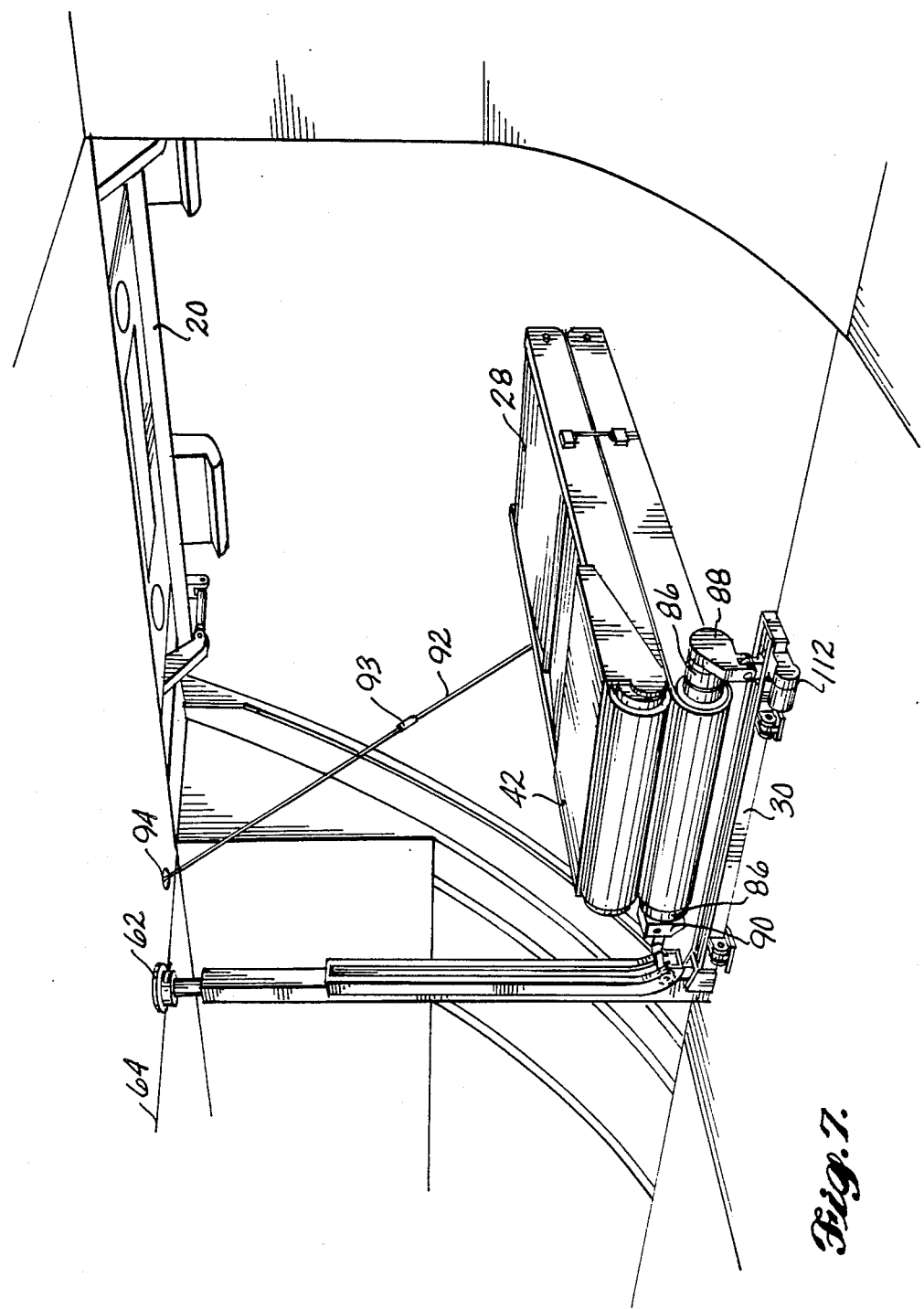

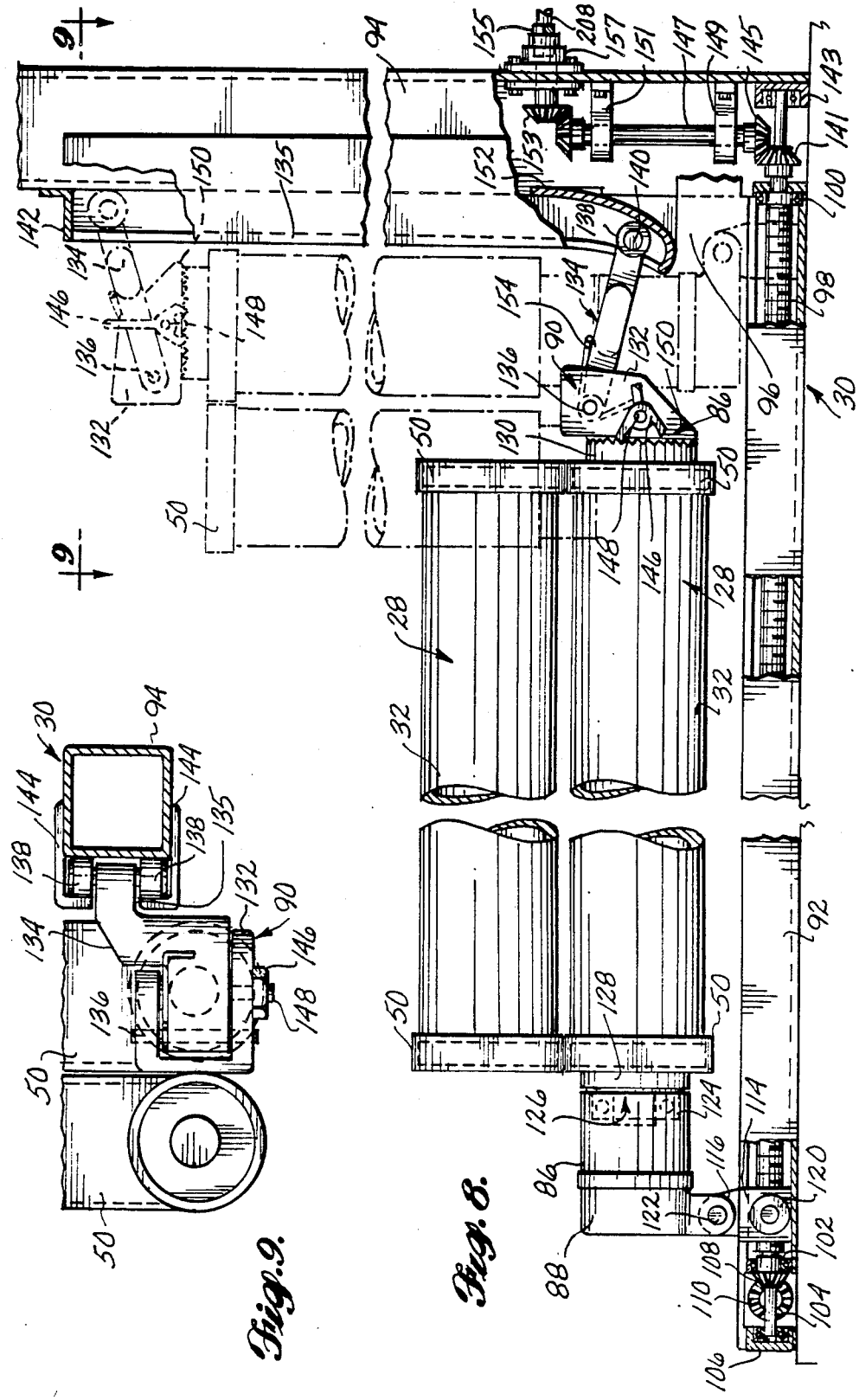

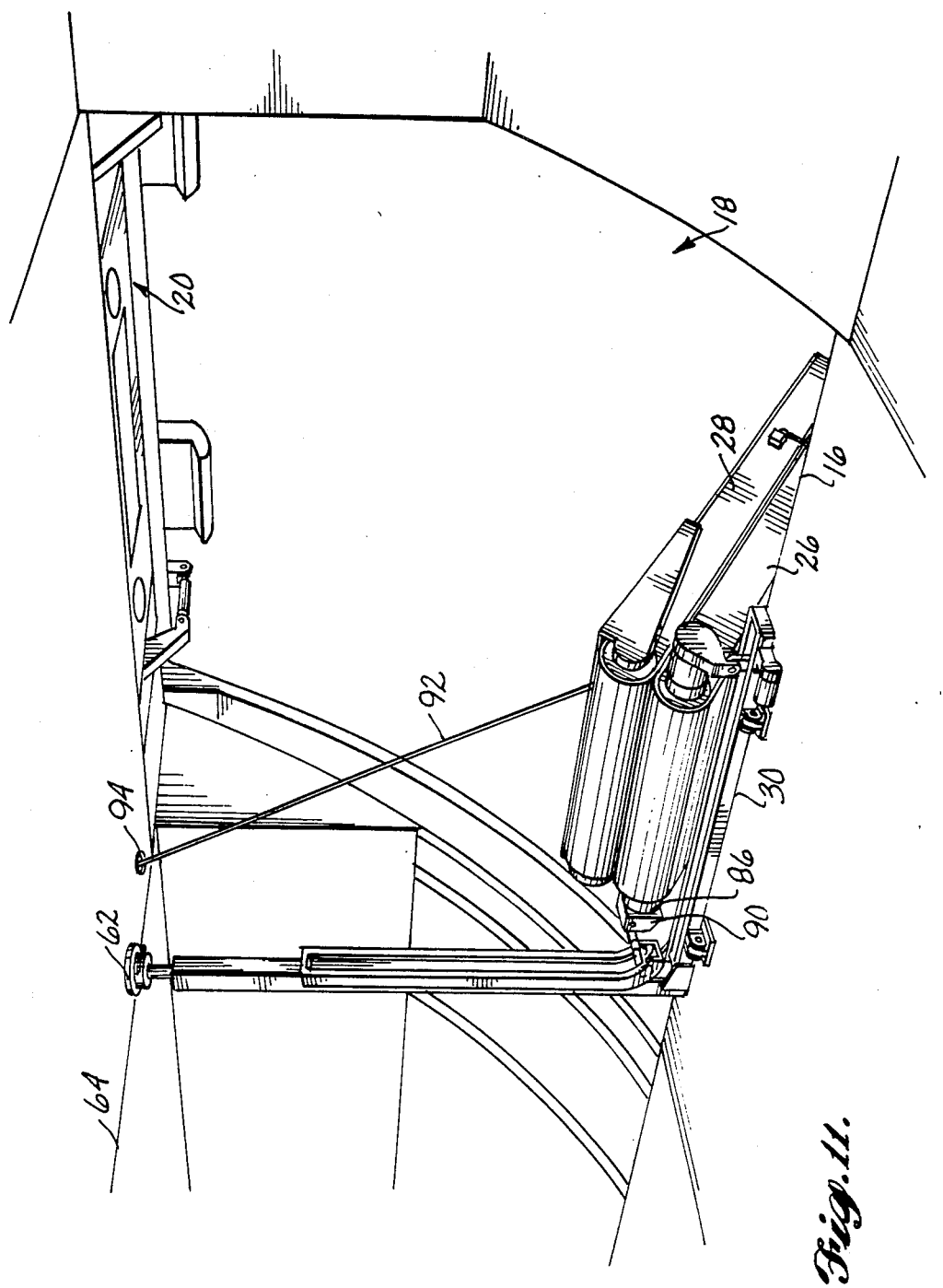

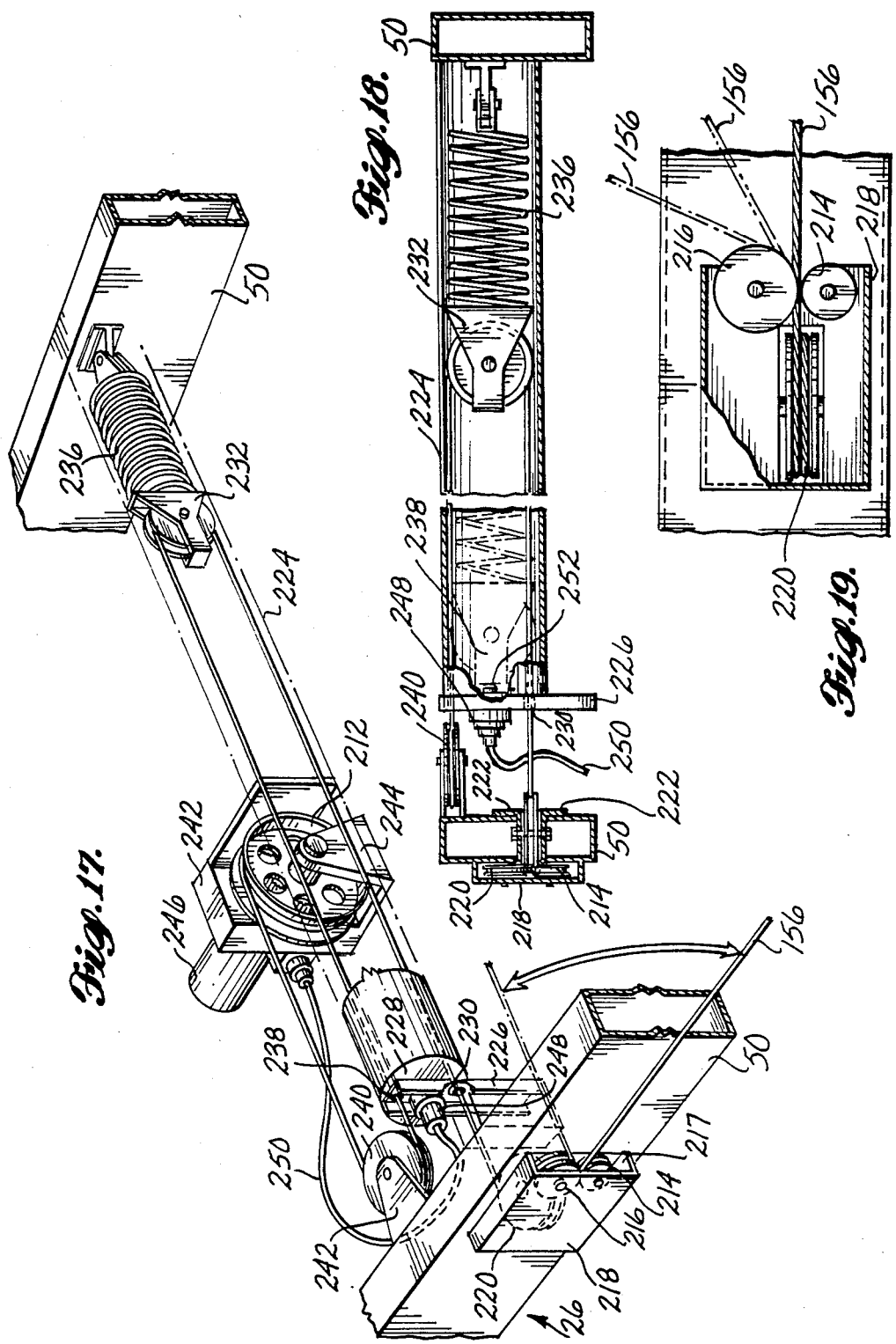

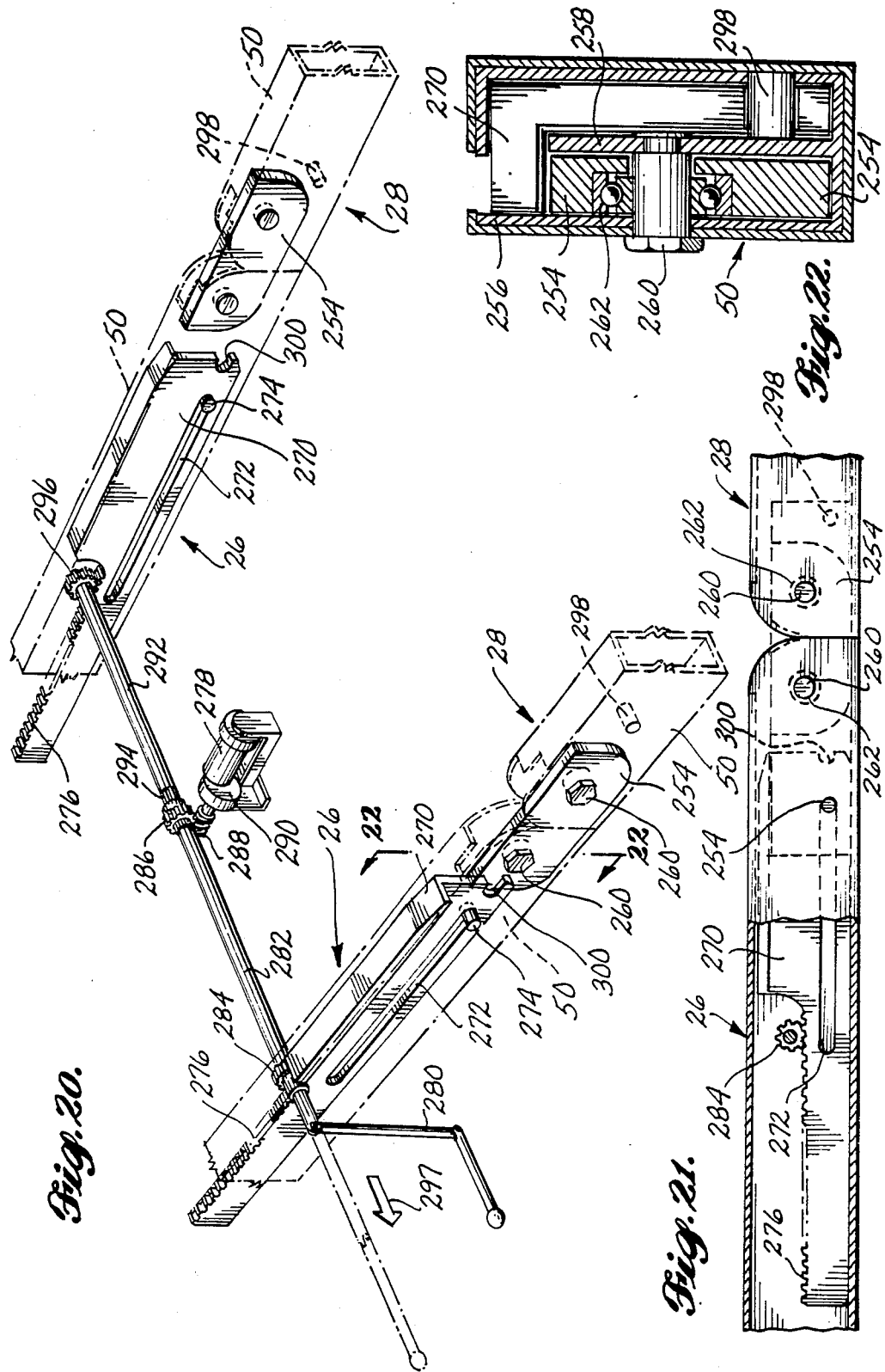

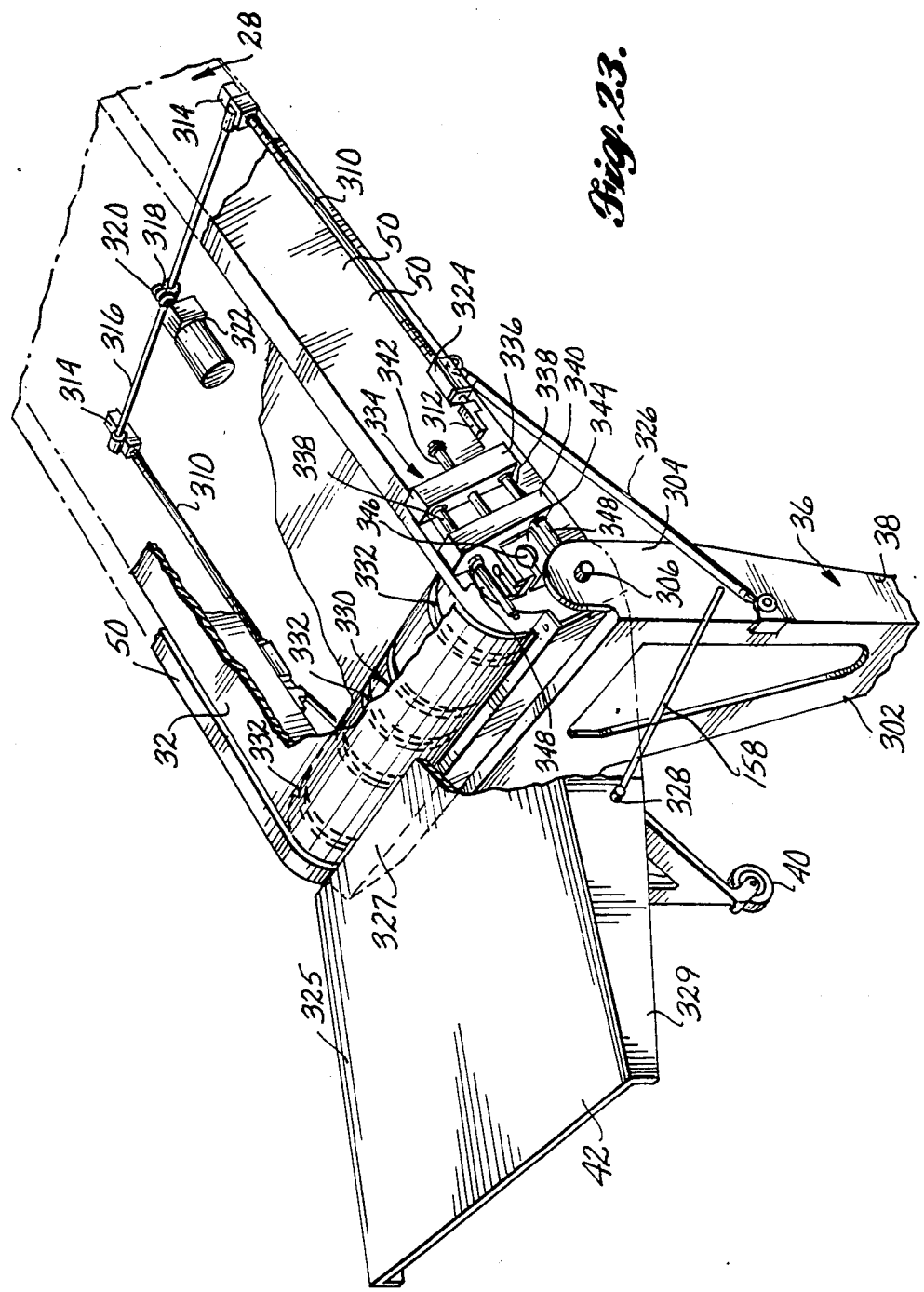

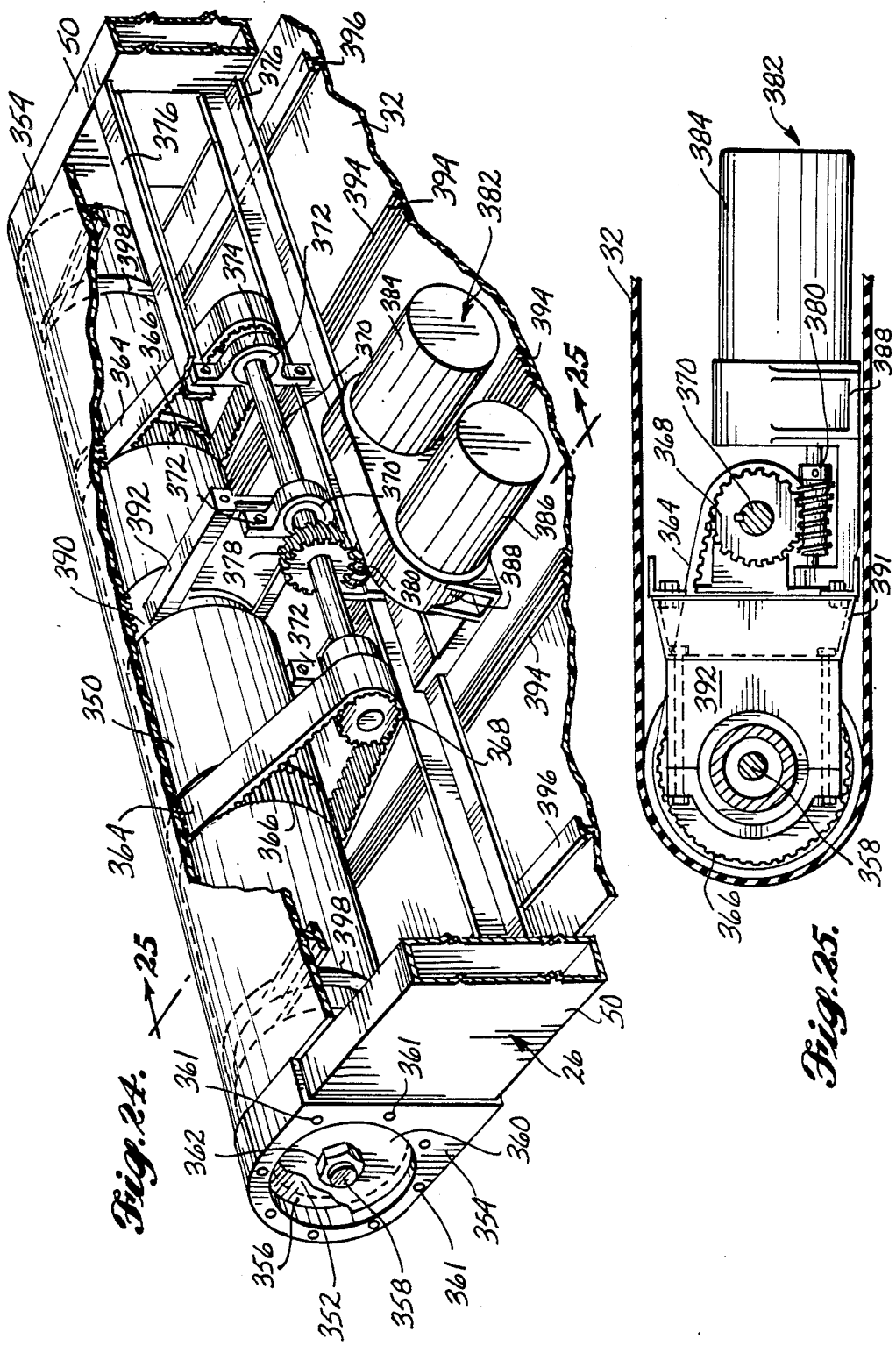

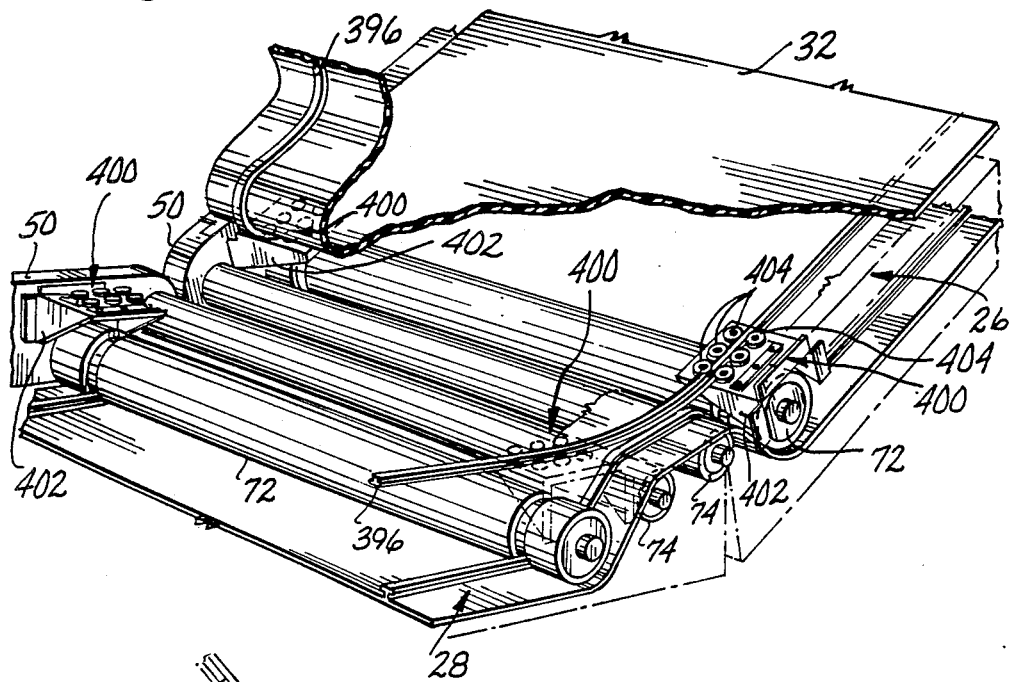
Fig. 26.
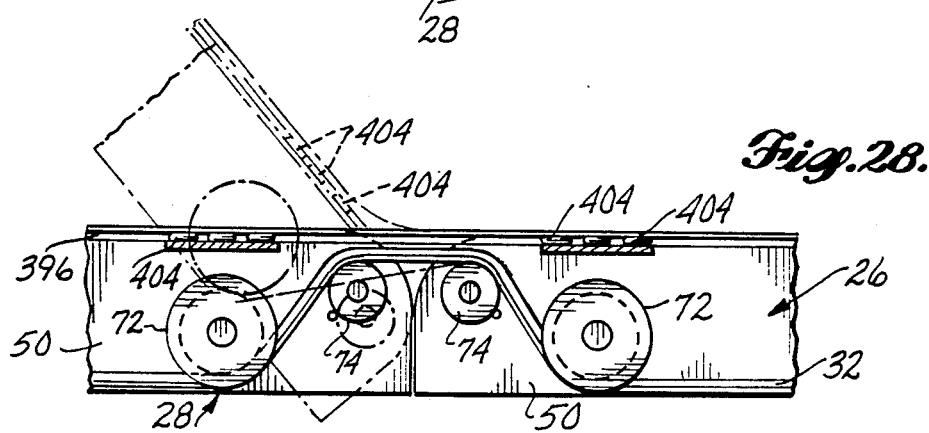
Fig. 28.
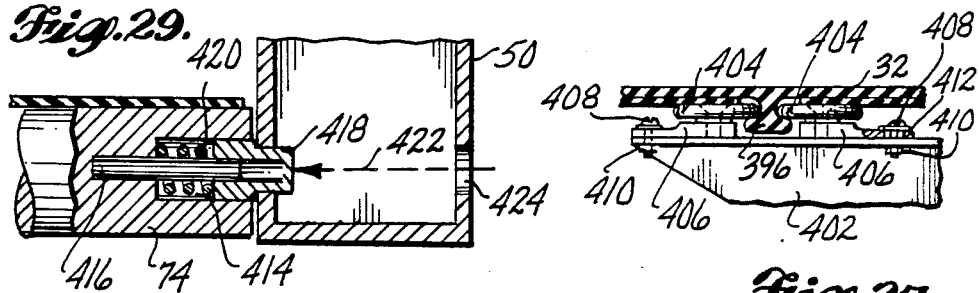
Fig. 29.
Fig. 27.

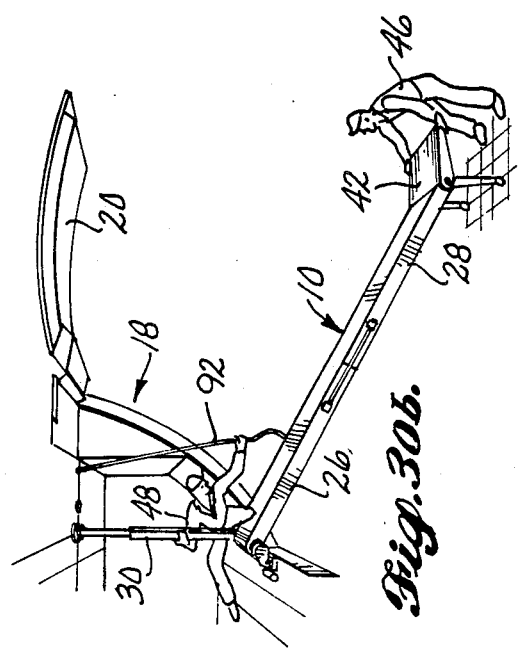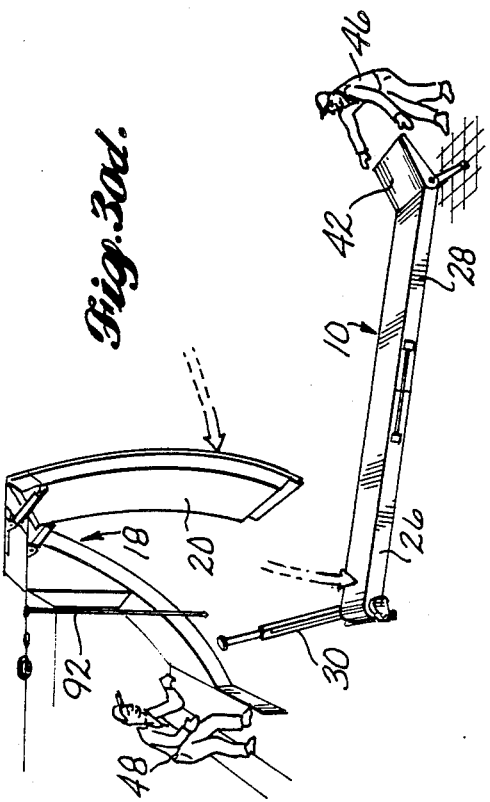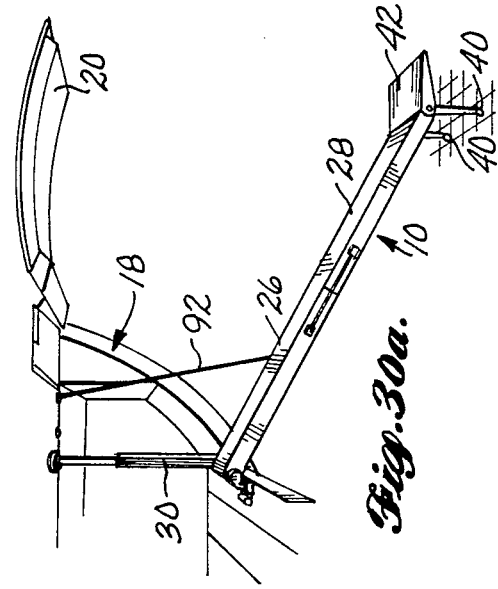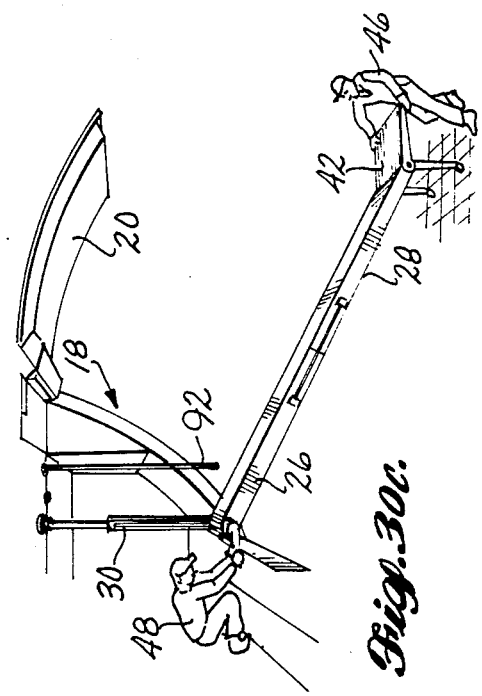

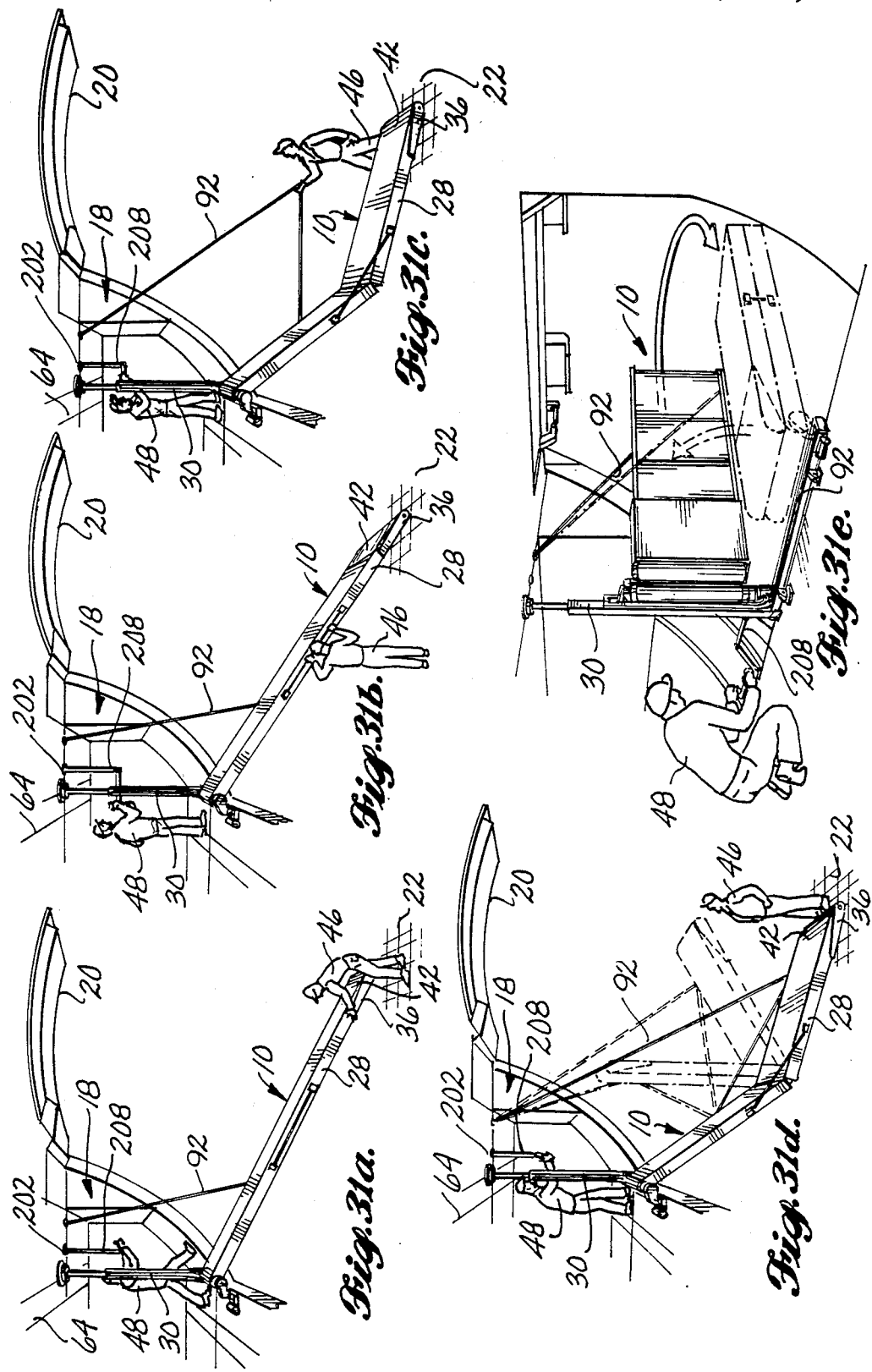

AIRCRAFT CARGO LOADER

BACKGROUND OF THE INVENTION

This invention relates to aircraft cargo handling and more particularly to a cargo loader configured to be easily carried on board an aircraft and deployed therefrom for the loading and unloading of small items of cargo such as baggage.

Although numerous systems exist for loading and unloading relatively large cargo and baggage containers that are carried by large passenger and/or cargo type aircraft, a need exists for an easily stowable cargo loader that can be carried on board an aircraft and deployed for the loading and unloading of relatively small cargo items such as baggage. For example, specially configured versions of modern, wide-bodied aircraft are sometimes employed by governmental units or business entities for carrying a relatively small number of passengers. Moreover, with respect to relatively large aircraft that are employed for commercial purposes, it is sometimes necessary to load or unload a relatively small number of cargo items. In these and other situations, the use of prior art cargo loaders that are carried on board an aircraft exhibits several disadvantages and drawbacks. Firstly, with respect to aircraft that are utilized for carrying relatively few passengers, the amount of cargo or baggage that must be loaded and unloaded does not warrant equipping the aircraft with a relatively heavy and complex prior art system. Secondly, with respect to aircraft that is equipped with conventional on board cargo loading equipment, activating and operating the cargo loading system requires a substantial amount of time and, thus, is not efficient when only a relatively small amount of cargo or baggage is to be loaded or unloaded. Yet, the elevation of the floor or deck of the cargo compartment of such an aircraft makes it difficult to manually load and unload such items and many airports are not equipped with ground support equipment that is capable of otherwise facilitating this type of cargo handling.

SUMMARY OF THE INVENTION

In accordance with this invention, loading and unloading of baggage and other small cargo items is facilitated by a ramp-like cargo loader that can be folded and stowed on the interior surface of the aircraft cargo door. In the disclosed embodiment of the invention, the cargo loader includes upper and lower, hinged together loader sections. The upper and lower sections are substantially rectangular in geometry and of substantially the same size.

When the cargo loader is deployed, the upper and lower sections extend downwardly in a straight line orientation to form a ramp-like cargo loader with the lower end of the loader being supported above the ground by wheeled legs that are pivotally attached to the lower terminus of the lower loader section. A table-like staging platform, which is also hinged to the lower terminus of the lower loader section, extends horizontally outward for receiving baggage or other items of cargo as they are loaded and unloaded. A powered, endless conveyor belt extends along the length of the loader that is defined by the upper and lower sections for movement of baggage and cargo between the staging platform and the aircraft cargo compartment.

The upper end of the deployed cargo loader is supported above the sill of the aircraft cargo opening by means of an L-shaped deployment track having a horizontal leg that is attached to the cargo deck and a vertical leg that extends upwardly along one side of the cargo opening. When the cargo loader is deployed, the upper end of the vertically extending leg of the deployment track passes into a socket-type fitting that is located in the ceiling of the cargo compartment.

When the cargo loader is stowed against the cargo door, the lower section of the loader is folded against the upper section of the loader, with the lower surface of the lower section facing inboard and the superposed upper and lower sections extending longitudinally along the cargo door. The staging platform is swung (i.e., folded) against the lower surface of the lower loader section and the support legs are rotated into position alongside the outside walls of the lower loader section. During stowage, the upper end of the loader extends orthogonally from the vertical leg of the deployment track, with the deployment track being detached from the deck and ceiling of the cargo compartment and being latched to the interior surface of the cargo door.

Deployment and retraction of the currently preferred embodiment of the invention is effected by means of: (a) a ball screw mechanism that is located within the horizontal leg of the deployment track for moving the upper end of the loader along the L-shaped deployment track; (b) an overhead cable assembly that assists in raising and lowering the loader during the deployment or retraction sequence; (c) a motor controlled damper assembly that controls hinged, swinging movement of the upper and lower loader sections; (d) a motor actuated locking mechanism that rigidly secures the upper and lower loader sections in the extended or deployed condition; and (e) a motor driven drive assembly for deploying and retracting the support legs.

During deployment of the cargo loader, the cargo loader is released from the interior surface of the cargo door and tipped into position so that the L-shaped deployment track extends along the deck of the cargo compartment and upwardly to the cargo compartment ceiling with the folded cargo ramp extending from the vertical leg of the deployment track and being substantially parallel with the cargo compartment door. The cargo compartment door is then opened and the folded cargo loader is swung outwardly so that it extends along the vertical leg of the L-shaped deployment track and is substantially orthogonal to the cargo opening. A motor driven ball screw is then operated to move the cargo ramp from the vertical to the horizontal position. The overhead cable system is then operated to lower the cargo loader in the folded position. The cargo loader is then unfolded and locked in the extended position utilizing the motor actuated locking system and the overhead cable assembly.

Preferably, the various motor driven deployment and retraction mechanisms are automatically energized and de-engerized by a control system that permits the loader to be deployed and retracted in a minimum amount of time. In addition, the motorized deployment and retraction mechanisms are configured for manual operation in the event of power failure or failure of one of the deployment and retraction mechanisms.

In accordance with another feature of the invention, the conveyor system of the disclosed embodiment is configured in a manner that prevents conveyor belt wear and maintains the endless conveyor belt under tension and in proper alignment when the cargo loader is in the folded (stowed) condition, when the cargo is fully deployed and when the cargo loader is being sequenced between the deployed and stowed conditions. Firstly, to permit folding of the conveyor belt at the juncture of the upper and lower loader sections without substantially changing belt tension, the portion of the conveyor belt that extends along the lower surface of the loader is routed inwardly toward the upper surface of the loader to place the upper and lower portions of the belt in close proximity with one another throughout the hinge region of the cargo loader. In the disclosed embodiments, the conveyor routing is achieved by routing the lower surface of the conveyor belt between rollers that extend across the lower portion of the upper and lower loader sections. Secondly, tension and alignment control is provided by a T-shaped strip that extends along each edge of the conveyor belt, projecting inwardly from the inside surface of the belt. Retaining guides that are mounted beneath the upper portion of the conveyor belt at the lower end of the upper loader section and the upper end of the lower loader section project into the groove-like regions formed between the inside face of the belt and the horizontally extending region of the inverted T-shaped strip to maintain the belt in contact with the upper surface of both loader sections when the cargo loader is folded for stowage.

BRIEF DESCRIPTION OF THE DRAWINGS

The aforementioned advantages and features of the invention and others, will be apparent to one skilled in the art upon reading the following description in conjunction with the accompanying drawings in which:

FIG. 4 illustrates the initial step of the cargo loader deployment sequence in which the aircraft cargo door is opened and the cargo loader deployment track is latched in position between the deck and ceiling of the aircraft cargo compartment;

FIG. 5 illustrates the socket-type fitting that secures the deployment track to the ceiling of the aircraft;

FIG. 7 illustrates the next step of the deployment sequence, in which the outwardly extending cargo ramp is driven along the deployment track to rotate the folded cargo loader into a horizontal position;

FIG. 8 is a partially cut-away side view of the cargo loader deployment track, which indicates the manner in which the cargo loader is rotated between the vertical and horizontal positions;

FIG. 9 is a cross-sectional view taken along lines 9—9 of FIG. 8;

FIGS. 11-14 illustrate the portion of the deployment sequence in which the cargo loader is swung downwardly from the aircraft cargo door and into the fully deployed condition;

FIG. 17 is a pictorial view of a motor driven damper cable system which controls the swinging movement of the two sections of the cargo loader during the deployment and retraction sequence;

FIG. 18 is a cross-sectional view of the damper cable system shown in FIG. 16;

FIG. 19 is a partially cut-away side view that depicts the manner in which the damper cable is routed through the sidewalls of the cargo loader;

FIG. 20 is a pictorial view illustrating a motor driven latch system that rigidly locks the two sections of the cargo loader in the deployed condition;

FIG. 21 is a partially cut-away side view of the latch mechanism of FIG. 20;

FIG. 22 is a cross-sectional view of the latch mechanism, taken along lines 22—22 of FIG. 20;

FIG. 23 is a pictorial view of the lower end of the cargo loader, illustrating a motor driven deployment mechanism for the folding leg assembly that supports the lower end of the deployed cargo loader;

FIG. 24 is a partially cut-away pictorial view of the upper end of the cargo loader, illustrating the drive system for the cargo loader conveyor belt;

FIG. 25 is a cross-sectional view of the conveyor belt drive system depicted in FIG. 24;

FIG. 26 is a pictorial view of the hinged interface between the upper and lower cargo loader sections, illustrating the manner in which the conveyor belt and the loader sections are configured to facilitate folding of the conveyor belt during retraction, deployment and stowage of the cargo loader;

FIG. 27 is a cross-sectional view illustrating the mounting of the conveyor idler rollers to the cargo loader;

FIG. 28 is a side view of the conveyor belt and loader hinge arrangement of FIG. 26;

FIG. 29 is a cross-sectional view which illustrates the manner in which the conveyor belt rollers can be attached to the loader sidewalls to facilitate removal of the conveyor belt;

FIGS. 30a-d illustrate an operational sequence by which the cargo loader can quickly be detached from the aircraft; and FIGS. 31a-e illustrate a manual retraction sequence that can be utilized in conjunction with the invention in the event of power or equipment failure.

DETAILED DESCRIPTION

Figure 1:
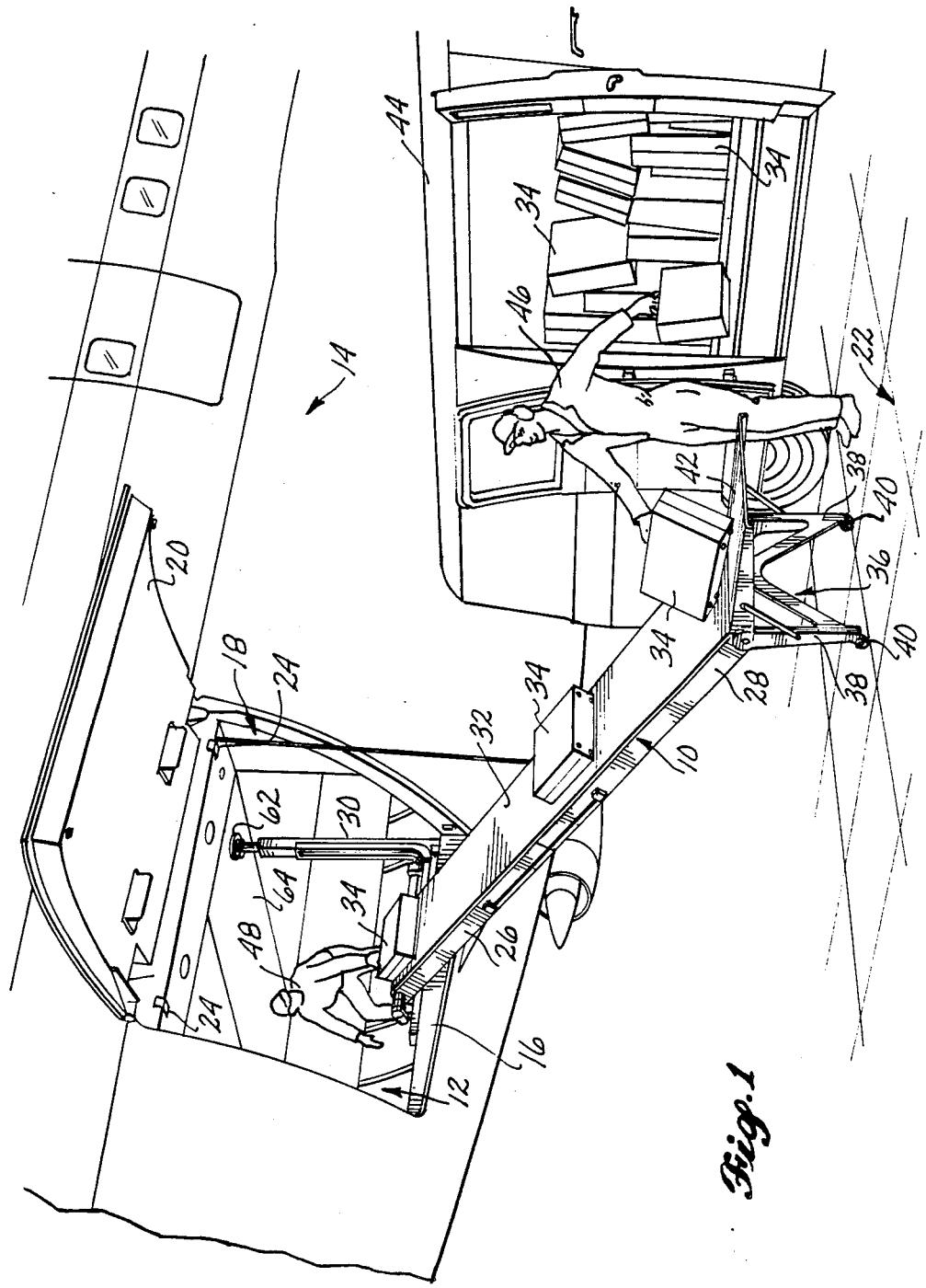
FIG. 1 is a pictorial view depicting a cargo loader that is constructed in accordance with this invention, with the cargo loader being shown deployed from the cargo opening of an aircraft.

FIG. 1 depicts a cargo loader (generally denoted by the numeral 10) that is constructed in accordance with this invention, with cargo loader 10 being shown deployed from a lower lobe cargo compartment 12 of an aircraft 14. In the arrangement of FIG. 1, the deployed cargo loader 10 extends downwardly from a position above the sill region 16 of a substantially rectangular cargo opening 18 of aircraft 14 with the lower end of the cargo loader 10 being supported on the surface of the ground 22. In the application of the invention illustrated in FIG. 1, cargo door 20 is a conventional cargo door that includes hinges 24 that permit cargo door 20 to be initially moved outwardly and then swung upwardly to provide access to cargo compartment 12. As shall be described in detail, cargo loader 10 includes an upper loader section 26 and a lower loader section 28 that are pivotably joined together at the juncture between the lower end of the upper loader section 26 and the upper end of the lower loader section 28. When cargo loader 10 is deployed in the manner shown in FIG. 1, the upper end of upper loader section 26 is supported by a horizontally extending leg of a substantially L-shaped deployment track 30. During the hereinafter-described power assisted and manual retraction sequences, lower loader section 28 is swung upwardly so that the upper and lower loader sections are folded together to form a compact package; the folded assembly is moved along the L-shaped deployment track 30 until the folded assembly extends upwardly from the floor of cargo compartment 12 (i.e., extends along the vertical leg of L-shaped deployment track 30); and both the folded assembly and the L-shaped deployment track 30 are fastened to the interior surface of cargo door 20 for stowage.

With continued reference to FIG. 1, cargo loader 10 includes a motor driven conveyor belt 32 that spans the length of upper section 26 and lower section 28. When cargo loader 10 is fully deployed, conveyor belt 32 is activated to move various items of relatively small cargo (e.g., baggage 34, in FIG. 1) between cargo compartment 12 and the surface of the ground. As is shown in FIG. 1, the lower end of cargo loader 10 is supported by a ground support assembly 36, which includes two spaced-apart legs 38. A wheel 40 is located at the lower terminus of each leg 38. Also included at the lower end of cargo loader 10 is a substantially rectangular staging platform 42 that is deployed to form a substantially horizontal table-like extension that projects outwardly from the lower end of cargo loader 10. Staging platform 42 provides a temporary resting place for cargo items 34 as they are moved between conveyor belt 32 and a van or other vehicle 44 by a cargo handler 46 who is stationed alongside staging platform 42. A second cargo handler 48, stationed in cargo compartment 12 at the upper terminus of cargo loader 10 moves the cargo items 34 between stowage positions within cargo compartment 12 and the upper terminus of conveyor belt 32.

Figure 2:
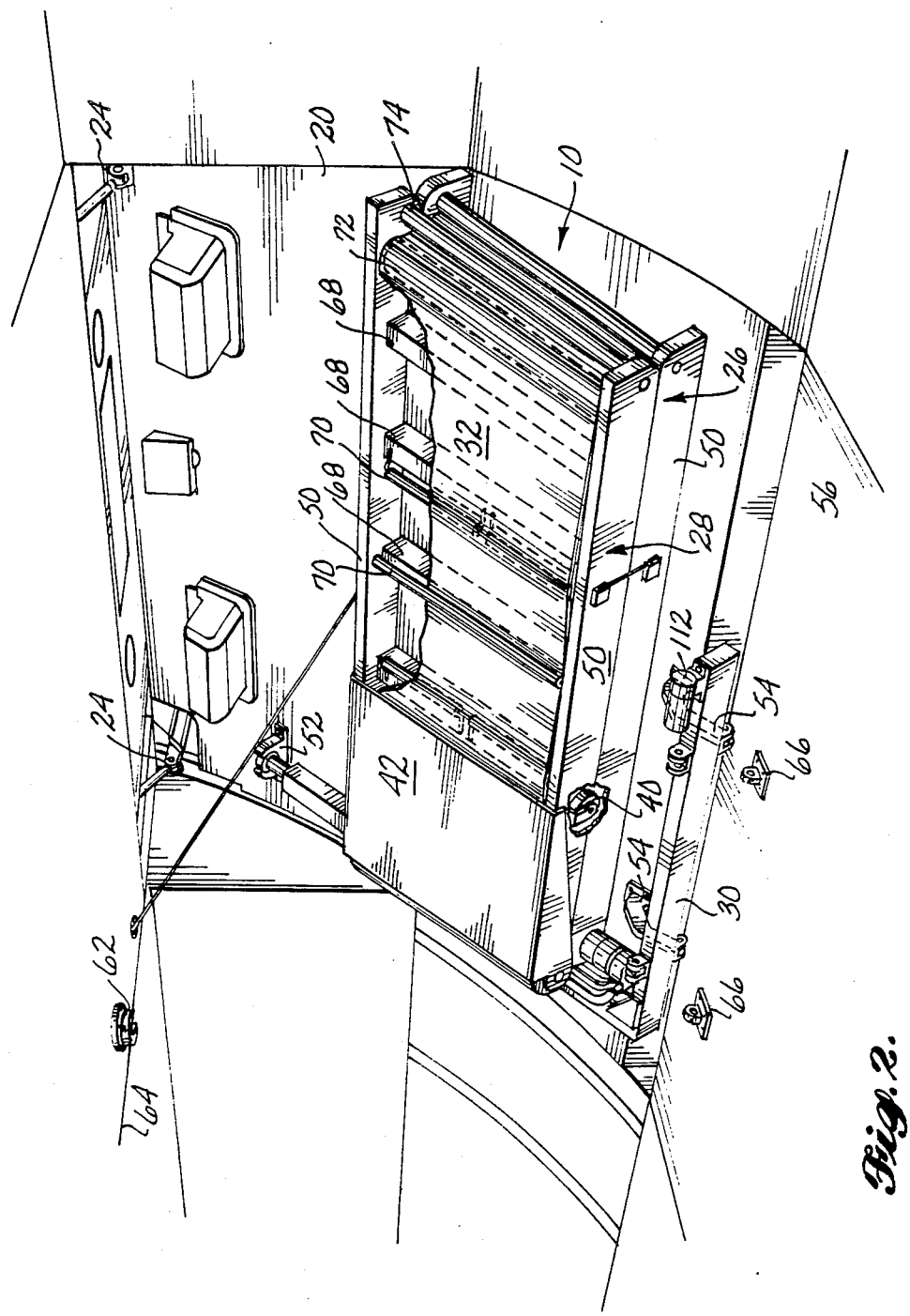
FIG. 2 illustrates the cargo loader of FIG. 1 in the stowed condition in which the cargo loader is folded and retained against the inner surface of the aircraft cargo door.

Referring now to FIG. 2, cargo loader 10 is stowed on the interior surface of door 20 with lower loader section 28 being folded against upper loader section 26 so that the upper surface of lower loader section 28 is in juxtaposition with the upper surface of upper loader section 26 and the lower surface of lower loader section 28 faces inboard (i.e., inwardly toward cargo compartment 12). When stowed, ground support assembly 36 is folded against the lower portion of lower loader section 28 with each leg 38 and wheel 40 being positioned alongside spaced-apart rectangular beams, which define the sidewalls 50 of lower loader section 28 (and upper loader section 26). Staging platform 42 also folds against the lower portion of lower loader section 28 during stowage of cargo loader 10.

As also is shown in FIG. 2, during stowage of cargo loader 10, the upper end of upper loader secton 26 remains engaged with L-shaped deployment track 30, which is secured to door 20 with one leg thereof extending in a direction parallel to one end of the folded cargo loader 10 and the other leg extending in the same direction as sidewalls 50 and being spaced apart therefrom. More specifically, cargo loader 10 is secured to cargo door 20 by means of a socket fitting 52 that receives the upper end of the upwardly extending leg of deployment track 30 and by spaced-apart stowage fittings 54 that are engaged with the horizontally extending leg of deployment track 30. As is shown most clearly in FIG. 3, each stowage fitting 54 is a relatively flat arm that is affixed to the interior surface of cargo door 20 and extends downwardly toward the cargo compartment deck 56. When cargo loader 10 is in the stowed position, the lower end of each stowage fitting 54 is positioned between spaced-apart flanges 58 that extend orthogonally outward from the horizontal leg of deployment track 30. To join stowage fittings 54 and deployment track 30, pins 60 pass through aligned openings in flanges 58 and stowage fittings 54.

As can be seen in FIG. 1, when cargo loader 10 is deployed, the end of the leg of deployment track 30 that extends parallel to the end of the folded cargo loader 10 is secured in a socket-like fitting 62 that is located in the ceiling 64 of cargo compartment 12 and the leg of deployment track 30 that extends parallel to cargo loader sidewalls 50 of the folded cargo loader 10 is secured to upwardly extending flanges of two spaced-apart mounting brackets 66 that are fastened to deck 56 of cargo compartment 12.

With reference to FIG. 2, upper and lower loader sections 26 and 28 are preferably constructed of structural members and spacers that are interconnected to form a relatively lightweight frame and roller system for conveyor belt 32. In the arrangement depicted in FIG. 2, the parallel, spacedapart beams that form the sidewalls 50 of upper and lower loader sections 26 and 28 are interconnected by a number of trapezoidally shaped crossmembers 68 that extend between the sidewalls 50 and are spaced apart from one another along the length of upper and lower loader sections 26 and 28. To support and guide conveyor belt 32, both upper and lower loader sections 26 and 28 include a plurality of idler rollers 70 that are spaced apart from one another and extend laterally between oppositely disposed sidewalls 50. In the embodiment shown in FIG. 2, conveyor belt 32 alternately passes above and below the spaced-apart idler rollers 70 that are mounted along the bottom of upper and lower loader sections 26 and 28 to thereby eliminate sagging of conveyor belt 32 and, further, to assist in maintaining conveyor belt 32 in proper orientation. As shall be described in more detail relative to FIGS. 26–28, the folding of conveyor belt 32 at the juncture between upper loader section 26 and lower loader section 28 is facilitated by a pair of hinge rollers 72 and 74 that are located at the upper end of lower loader section 28 and extend between the oppositely disposed sidewalls 50. As can be seen in FIG. 2, conveyor belt 32 passes between hinge rollers 72 and 74 so that conveyor belt 32 is routed from the upper surface of lower loader section 28 toward the lower surface of upper loader section 26 within the region of cargo loader 10 that is folded for stowage (i.e., the upper end region of lower loader section 28). As shall be described relative to FIGS. 26–28, similarly arranged hinge rollers are included at the lower end of upper loader section 26 to maintain relatively constant tension on conveyor belt 32 when cargo loader 10 is folded for stowage and, in addition, to eliminate wear and damage that could occur if conveyor belt 32 is sharply folded when cargo loader 10 is folded for stowage.

Although FIG. 2 illustrates cargo compartment door 20 in a partially opened condition with cargo loader 10 in the stowed position, cargo loader 10 is normally detached from door 20 and interconnected with socket fitting 62 and mounting brackets k66 prior to the time at which cargo compartment door 20 is opened. In this regard, although cargo loader 10 can remain in the stowed condition (attached to cargo door 20), when door 20 is to be opened and cargo loader 10 is not required, it is generally advantageous to remove cargo loader 10 from door 20 to eliminate additional loading on door 20 as it is swung into the open position.

Figure 3:
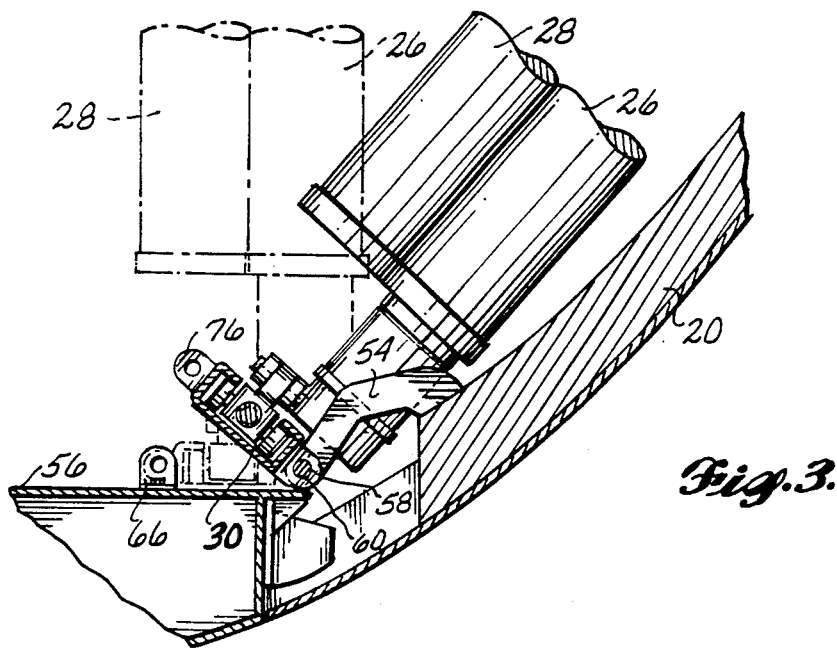
FIG. 3 is a partial side elevation view that illustrates the manner in which the cargo ramp is transferred from the cargo door and attached to the deck of the cargo compartment for deployment.

Deployment of cargo loader 10 can be understood with reference to FIGS. 2–14. The first step of the sequence utilized to fully deploy cargo loader 10 is shown in FIGS. 2–4. During this step, the horizontal leg of deployment track 30 is attached to mounting brackets 66, which are mounted in cargo compartment deck 56 and the upper end of the vertical leg of deployment track 30 is removed from stowage fitting 52 and engaged with socket fitting 62 in ceiling 64 of cargo compartment 12. With particular reference to FIG. 3, when the upper end of deployment track 30 is disengaged from stowage fitting 52, deployment track 30 and the folded cargo loader 10 are rotated about pin 60 (which joins stowage fittings 54 to the horizontal leg of deployment track 30). As deployment track 30 (and the folded cargo loader 10) reaches a substantially vertical position (shown in phantom lines in FIG. 3), a pair of spaced-apart flanges 76 that are substantially coplanar with the flanges 58 and extend inwardly from the horizontal leg of deployment track 30 pass along each side of the upwardly extending flanges of the two spaced-apart mounting brackets 66. Pins (not shown in FIG. 3) are inserted in aligned openings of each set of flanges 76 and the upwaradly extending leg of the mounting bracket 66. Deployment track 30 and the folded cargo loader 10 are then disconnected from cargo door 20 by removing pins 60 from the aligned openings in stowage fittings 54 and flanges 58 of the horizontal leg of deployment track 30. Cargo door 20 then can be opened utilizing the associated aircraft power assisted door drive system.

As is shown in FIG. 4, when the horizontal leg of the L-shaped deployment track 30 is engaged with mounting brackets 66, the folded cargo loader 10 extends longitudinally across cargo opening 18, with the upper end of the vertical leg of deployment track 30 being engaged with the ceiling mounted socket-type fitting 62. More specifically, as is shown by FIGS. 4 and 5, the upper end of the vertical leg of deployment track 30 includes an upwardly extending tubular section 78. As the L-shaped deployment fitting 30 and folded cargo loader 10 are swung into the vertical position in the manner described relative to FIGS. 2 and 3, the end of tubular section 78 passes into a downwardly projecting semicircular flange 80 of socket-type fitting 62. To retain tubular section 78 in socket-type fitting 62, downwardly extending flange 80 includes a locking strip 82 that can be slid along a groove in flange 80 to allow tubular section 78 to pass into flange 80 and can be rotated to encompass tubular section 78. In the arrangement shown in FIG. 5, locking strip 82 includes an outwardly extending projection 84 that permits the system operator to easily slide locking strip 82 between the open and closed positions.

Figure 6:
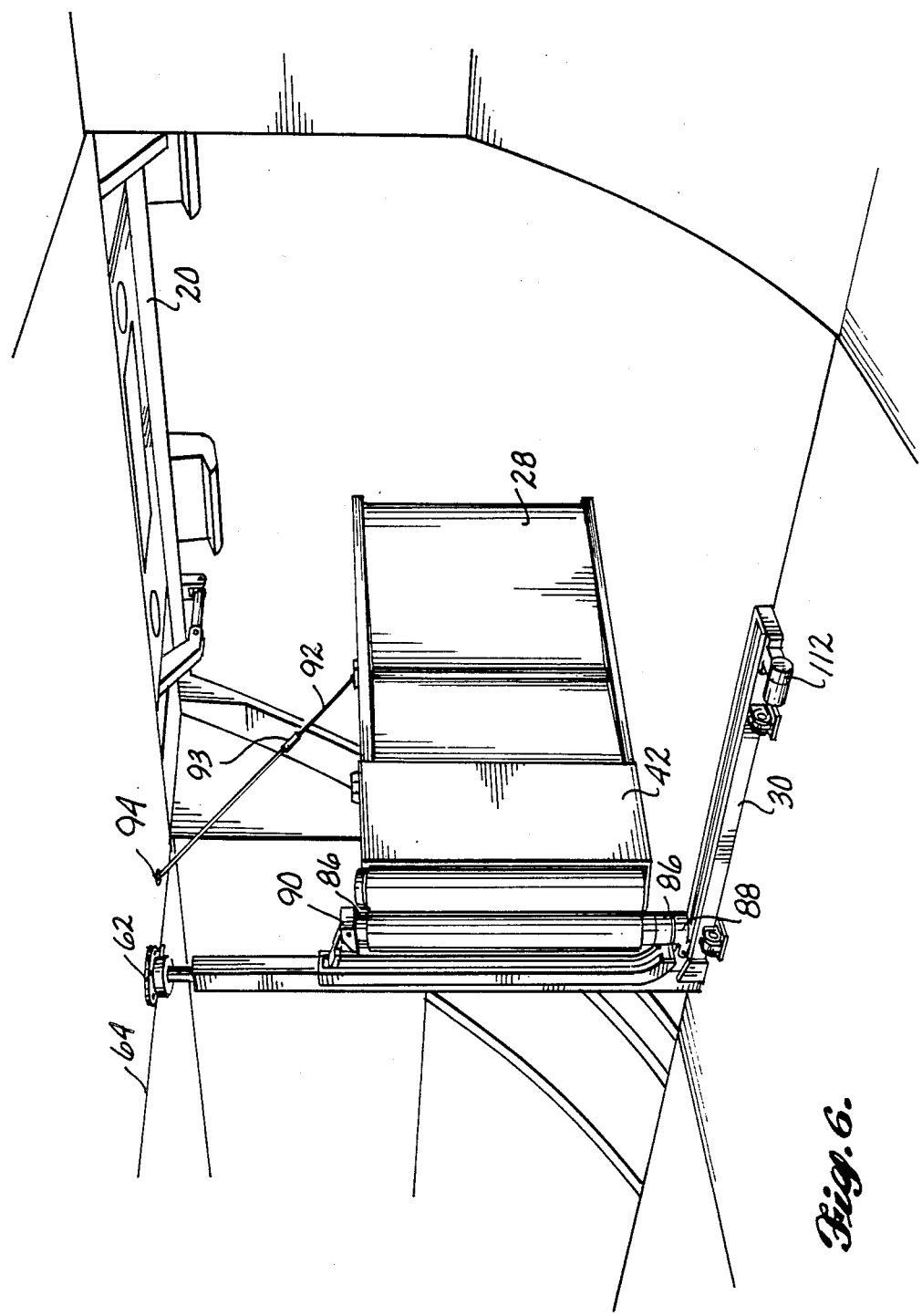
FIG. 6 illustrates the next step of the deployment sequence, in which the cargo loader is swung outwardly through the aircraft cargo opening.

With cargo loader 10 positioned in the manner shown in FIG. 4, the next step of the deployment sequence is to swing cargo loader 10 about the vertically extending leg of L-shaped deployment track 30. As is shown in FIG. 6, this positions the folded cargo 10 so that it extends substantially perpendicular to the horizontal leg of L-shaped deployment track 30 and is closely adjacent to one edge of cargo opening 18. Since the major portion of cargo opening 18 is not occupied by cargo loader 10, it often is possible to place cargo loader 10 in the outwardly extending position depicted in FIG. 6 when equipment other than cargo loader 10 is to be utilized in loading or unloading cargo items.

The swinging movement of cargo loader 10 from the position depicted in FIG. 4 (folded cargo loader 10 extending longitudinally across cargo opening 18) to the outwardly extending position of FIG. 6 is facilitated by bearing assemblies 86 that are mounted to the upper end of upper loader section 26. More specifically, each bearing assembly 86 includes a cylindrical housing that is affixed to and extends outwardly from the upper terminal region of sidewalls 50 of upper loader section 26. As shall be described in more detail relative to FIG. 8, the bearing assemblies 86 are interconnected with deployment fittings 88 and 90 which interconnect the upper end of upper loader section 26 with L-shaped deployment track 30.

As also is shown in FIG. 6, a support cable 92 extends between approximately the midpoint of upper sidewall 50 of upper loader section 26 and an opening 94 that is located in ceiling 64 of cargo compartment 12. A cable release mechanism 93, located near sidewall 50 of upper loader section 26, allows support cable 92 to be disconnected from cargo loader 10 when the cargo loader is removed from the aircraft. As shall be described hereinafter, support cable 92 is utilized to raise and lower cargo ramp 10 during the deployment and retraction sequences. Further, in the currently preferred realizations of the invention, opening 94 in cargo compartment ceiling 64 is positioned outwardly from deployment track 30. In these realizatins of the invention, static force is cable 92 initiates swinging movement of the folded cargo ramp 10 between the position shown in FIG. 4 (cargo ramp 10 extending laterally across cargo opening 18) and the position shown in FIG. 6 (folded cargo ramp 10 extending through cargo opening 18). As shall be described in more detail relative to FIGS. 8 and 9, in these currently preferred realizations of the invention, the uppermost bearing assembly 86 includes a ratchet mechanism that is manually operable to swing the folded cargo loader 10 into the position of FIG. 6.

The next step of the deployment sequence is to move the folded cargo loader 10 from the position depicted in FIG. 6 in which the cargo loader extends substantially vertically into the position of FIG. 7, in which the folded cargo loader 10 is substantially horizontal (extends along the horizontal leg of deployment track 30). The manner in which L-shaped deployment track 30 and the upper end of upper loader section 26 are arranged for moving the folded cargo loader 10 between vertically and horizontally extending positions is illustrated in FIGS. 8–10.

As is shown in FIG. 8, the horizontal leg of L-shaped deployment fitting 30 is formed by a rectangular channel 92 that extends orthogonally from one end of a vertical tube 94 which defines a portion of the vertical leg of L-shaped deployment track 30. Vertical tube 94 is of square cross-sectional geometry and is joined to channel 92 by a gusset plate 96. A ball screw 98 extends through channel 92 with one end of ball screw 98 being supported in a bearing 100. As is shown in FIG. 8, bearing 100 is mounted at the end of channel 92 that is joined to vertical tube 94. The other end of ball screw 98 is supported by spaced-apart bearings 102 and 106 that are located at the opposite end of channel 92. A pinion gear 108 is affixed to shaft 104 of ball screw 98 at a position between bearings 102 and 106. Pinion gear 108 mates with a pinion gear 110, which is mounted to a shaft (not shown in FIG. 8). An L-head electric motor 112 (FIGS. 2, 4, 6 and 7) rotates pinion gears 108 and 110 to drive ball screw 98. Also engaged with ball screw 98 is a ball screw unit 114, having an upwardly extending lug 116. As is shown most clearly in FIG. 10, ball screw nut 114 and lug 116 project upwardly through a slot 118 that extends along the upper surface of channel 92.

Figure 10:
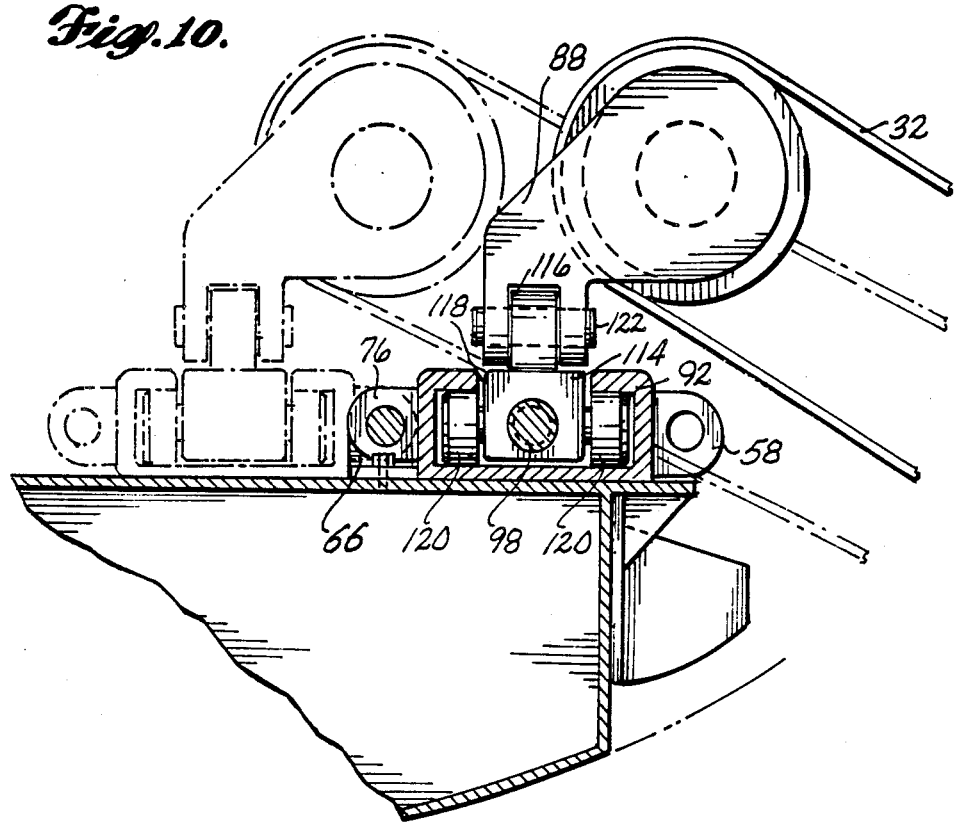
FIG. 10 is a cross-sectional view of the deployment track shown in FIG. 8.

As is shown by FIGS. 8 and 10, a wheel 120 is mounted to each side of ball screw nut 114 to support the bell screw above the lower surface of channel 92 and permit ball screw nut 114 to easily travel along the length of channel 92 as motor 112 rotates ball screw 98. As also is shown by FIGS. 8 and 10, lug 116 of ball screw nut 114 is located between spaced-apart flanged regions of deployment fitting 88, which is attached to the upper end of upper loader section 26. A hinge pin 122 passes through aligned openings in the flanges of deployment fitting 88 and lug 116 to allow deployment fitting 88 (and folded cargo loader 10) to rotate about ball screw nut 114 (and hence about the horizontal leg of L-shaped deployment track 30).

As also is shown in FIGS. 8 and 10, the upper portion of deployment fitting 88 is of cylindrical geometry and, in effect, defines a cylindrical end cap that forms one part of bearing 86 which, as described relative to FIG. 6, permits the folded cargo loader 10 to be swung outwardly through cargo opening 18. More specifically, as is shown in FIG. 8, the cylindrical end region of deployment fitting 88 includes a conventional bearing 124 (e.g., a ball bearing or roller bearing). Passing into the central opening of bearing 124 is a circular shaft 126 which projects outwardly from a circular flange 128. The flange 128 is mounted to sidewall 50 of upper loader section 26, with the centerline of rotation of bearing 124 and shaft 126 being coincident with the axial centerline of sidewall 50. As was described relative to FIG. 6, and as is indicated in FIG. 8, a bearing 86 is also formed in deployment fitting 90, which interconnects the opposite side of the upper end of upper loader section 26 to the vertical leg of L-shaped deployment track 30.

As is shown in FIGS. 8 and 9, deployment fitting 90 includes a substantially cylindrical section 130 that extends outwardly from sidewall 50 of upper loader section 26. Cylindrical region 130 is similar to flange 128 of deployment fitting 88 in that cylindrical region 130 is affixed to sidewall 50 and forms one-half of the previously discussed bearing 86. Outwardly of cylindrical section 130 is an upwardly extending region 132 in which cylindrical section 130 rotates. As is shown in FIG. 9, upwardly extending region 132 exhibits a substantially U-shaped cross-sectional geometry with the open end thereof facing toward the vertically extending leg of L-shaped deployment track 30.

A follower arm 134 extends outwardly from the U-shaped channel region of upwardly extending region 132, with the upper end of follower arm 134 being connected to upwardly extending region 132 by a hinge pin 136 that passes through follower arm 134 and the walls of upwardly extending region 132. As is shown most clearly in FIG. 9, follower arm 134 is somewhat Z-shaped in geometry, extending outwardly from the U-shaped channel of upwardly extending region 132; transversely toward L-shaped deployment track 30; and then inwardly through a slot 135 that extends along the vertical leg of deployment track 30. Mounted at the end of follower 134 that passes into the vertically extending leg of deployment track 30 is a pair of wheels or rollers 138. More specifically, as is shown both in FIGS. 8 and 9, a wheel 138 is positioned on each side of the outward end of follower arm 134 with the wheels being mounted to follower arm 134 by an axle 140 that passes through the wheels 138 and follower arm 134. As also is shown in FIGS. 8 and 9, the wheels 138 are retained within and guided by a guide channel 142 that is affixed to the face of vertically extending tube 94 that faces inwardly toward cargo opening 18. In the depicted arrangement, the guide channel 142 is defined by two L-shaped flanges 144 that are mounted to vertically extending tube 94 so that a substantially rectangular recess is formed along vertically extending tube 94. As is shown most clearly in FIG. 9, follower arm 134 extends through a slot 135 that is formed between the spaced-apart flanges 144 with wheels 138 contacting both the face of vertically extending tube 94 and one inner surface of each L-shaped flange 144.

As previously was mentioned, the L-shaped deployment track 30 depicted in FIGS. 8, 9 and 10 is utilized when the folded cargo loader 10 is swung outwardly through cargo opening 18 (i.e., moved from the position shown in FIG. 4 to the position in FIG. 6) and is also utilized in moving the folded cargo loader from a position in which the cargo loader is vertical and projects outwardly through cargo opening 18 (FIG. 6) to a position in which the folded cargo loader is substantially horizontal and extends outwardly through cargo opening 18 (FIG. 7). To prevent the vertically extending folded cargo loader 10 from swinging inwardly when it swings to the outwardly extending position shown in FIG. 6, deployment fitting 90 includes a ratchet arm 146 that is mounted to upwardly extending region 132 of deployment fitting 90. As is indicated by the phantom lines in FIG. 8, the lower portion of ratchet arm 146 includes spaced-apart pawls that can be engaged in a series of notches 150 that are formed in the end of cylindrical region 130. Since cylindrical region 130 is rotatable relative to upwardly extending region 132, ratchet arm 146 can be utilized to prevent the folded cargo loader 10 from swinging inwardly through cargo opening 18 when it is swung inwardly to the position shown in FIG. 4.

When the folded cargo loader 10 is in the position shown by phantom lines in FIG. 8 (i.e., the position shown in FIG. 6), driving ball screw 98 with motor 112 causes ball screw nut 114 to move along the horizontal leg of deployment track 30 (i.e., to move away from the vertically extending leg of deployment track 30). As ball screw nut 114 advances away from the vertically extending leg of deployment track 30, the folded cargo loader 10 rotates from the vertical position to the horizontal position with wheels 138 of follower arm 134 moving downwardly along guide channel 142. As the folded cargo loader 10 approaches a horizontal position, wheels 138 of follower arm 134 pass from the surface of vertically extending tube 94 and are guided by an arcuately shaped plate 152 that is affixed to vertically extending tube 94 and forms the lower terminus of guide channel 142. In this regard, arcuately shaped plate 152 provides a radiused region at the lower end of guide channel 142 which allows the folded cargo loader 10 to swing smoothly into the horizontal position and which provides a mechanical stop for wheels 138 of follower arm 134 when the folded cargo loader 10 reaches a substantially horizontal position. When the folded cargo loader 10 is horizontal (FIG. 7), ball screw nut 114 is positioned adjacent to bearing 102 of the horizontal leg of deployment track 30 with deployment fitting 88 supporting one side of the upper terminus of upper loader section 26 and deployment fitting 90 and follower arm 134 supporting the other side of the upper terminus of upper loader section 26. As is shown in FIG. 8, a torsion spring 154 surrounds hinge pin 136 to supply a force that acts downwardly on the upper end of follower arm 134. This force maintains the folded cargo loader 10 in the proper position as the folded cargo loader is rotated from the vertical to the horizontal position.

To permit manual operation of ball screw 98 in the event of failure of the aircraft power system or motor 112, L-shaped deployment track 30 is equipped with a gear system that drives the end of ball screw 98 that is located within vertical tube 94. More specifically, as is illustrated in FIG. 8, a pinion gear 141 is located on a portion of ball screw 98 that extends through bearing 100 and into a bearing 143, which is mounted to the interior sidewall of vertical tube 94. Engaged with pinion gear 141 is a pinion gear 145, which is mounted to one end of a shaft 147. Shaft 147 is substantially parallel to the sidewall of vertical tube 94 and is mounted for rotation within two spaced-apart bearings 149 and 151, which are affixed to vertical tube 94. Mounted to the upper end of shaft 147 is a pinion gear 153, which is mounted to a shaft 155 that extends orthogonally outward through the sidewall of vertical tube 94. To permit rotation of shaft 155 and, hence, manual rotation of ball screw 98, shaft 155 is journaled within a bearing 157 that is attached to the sidewall of vertical tube 94. As is indicated in FIG. 8, the outer end of shaft 155 includes a recess that is configured for receiving the end of a handcrank, such as handcrank 208 of FIG. 15.

Returning now to a description of the basic deployment sequence for cargo loader 10, when the folded cargo loader is moved to the position shown in FIG. 7, the cargo loader 10 is then lowered so that the outward end of cargo loader 10 extends downwardly toward the surface of the ground (FIG. 11). As is indicated in FIG. 11, cargo loader 10 is lowered by means of support cable 92. As shall be described relative to FIGS. 15 and 16, support cable 92 is extended and retracted by a cable drive assembly that is mounted above the ceiling 64 of cargo compartment 12. As shall become apparent in view of the steps of the deployment sequence that are discussed relative to FIGS. 12 and 13, the angle formed between folded cargo loader 10 and door sill 16 of FIG. 11 is such that the lower end of lower loader section 28 will rest on the ground when lower loader section 28 is swung about upper loader section 26.

Figure 12:
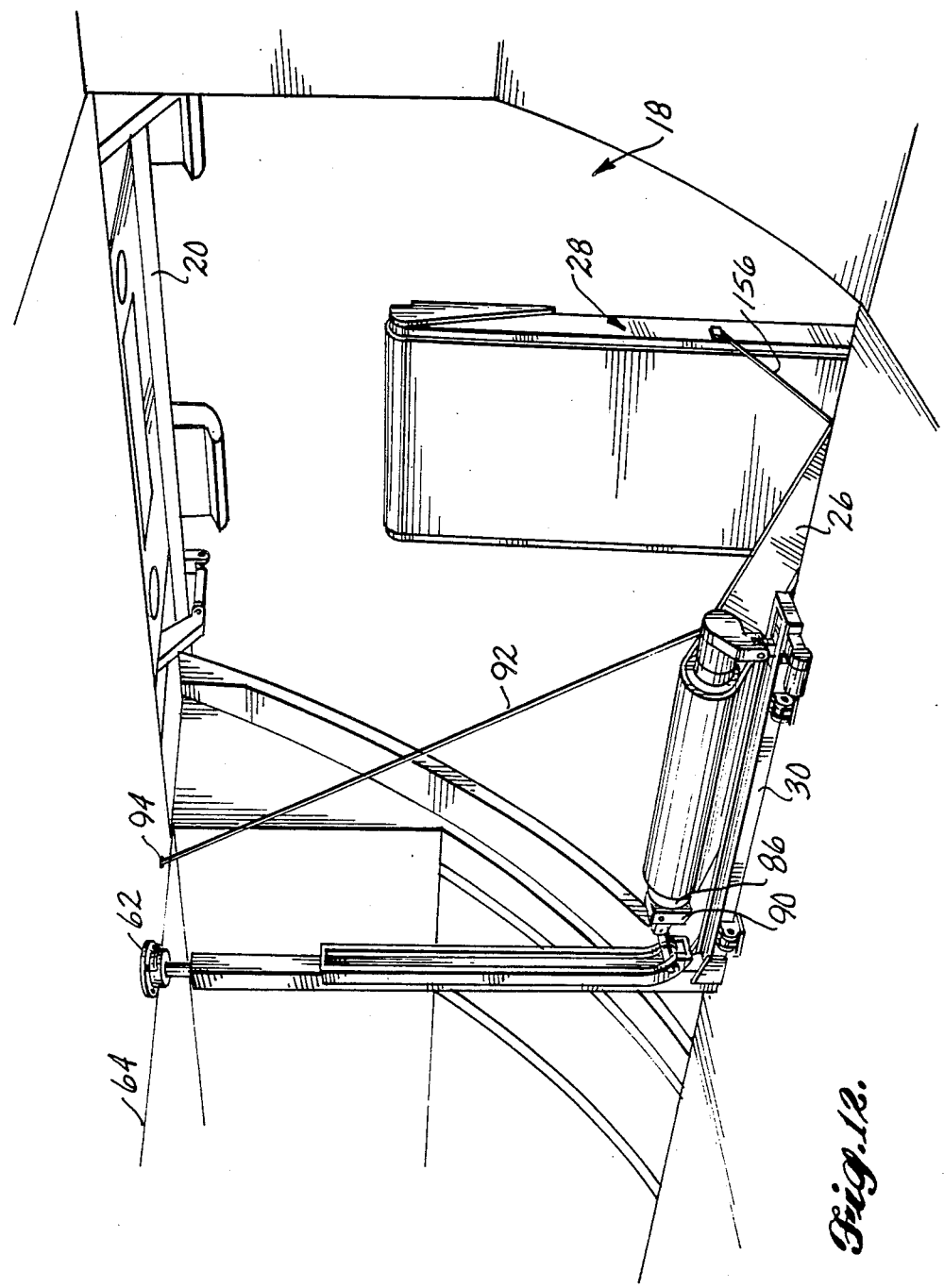
Figure 13:
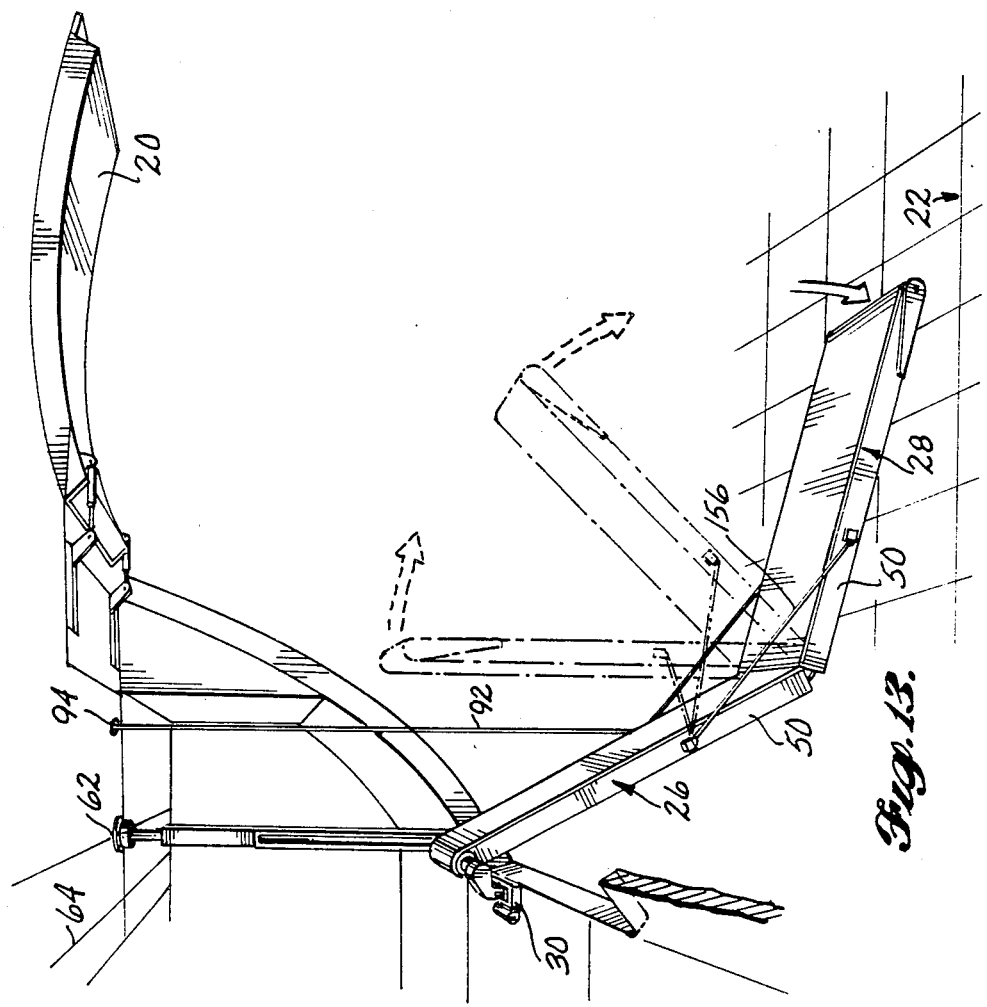

More specifically, as is shown in FIG. 12, during the next step of the deployment sequence, the free end of lower loader section 28 is manually pushed outwardly until lower loader section 28 is substantially vertical. As is shown in FIG. 13, as lower loader section 28 is manually pushed beyond the vertical position, it swings downwardly until the lower end of lower loader section 28 contacts the surface of the ground 22. As shall be described relative to FIGS. 17-19, the swinging movement of lower loader section 28 from the vertical position to the position in which the end of lower loader section 28 rests on the ground is controlled by a damper cable 156 that is attached to sidewall 50 of lower loader section 28 at a point slightly less than one-half the distance between the upper and lower ends of lower loader section 28. During this portion of the deployment sequence, damper cable 156 is extended by means of a motor driven cable drum that is mounted within the interior region of upper loader section 26. As also is shown in FIG. 13, when the lower end of lower loader section 28 rests on the surface of the ground 22, lower loader section 28 and upper loader section 26 are not in alignment with one another. That is, the cargo loader 10 is not completely unfolded, but remains in a slightly jack-knifed condition.

Figure 14:
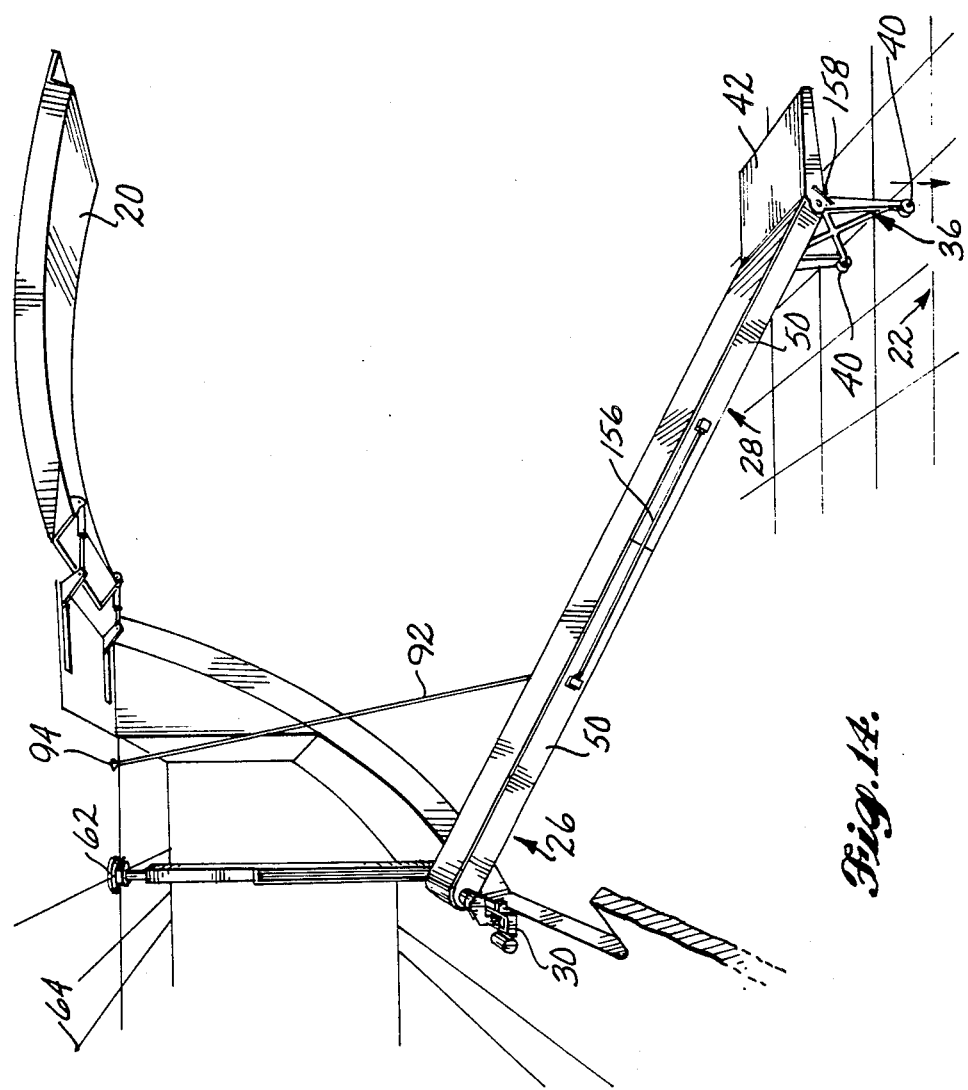

Referring now to FIG. 14, during the next step of the deployment sequence, the previously mentioned cable drive assembly that is located above ceiling 64 of cargo compartment 18 is then activated to retrieve support cable 92 and, thus swing upper loader section 26 upwardly about the previously discussed bearing assemblies that are located in deployment fittings 88 and 90 of the L-shaped deployment track 30. This causes upper loader section 26 and lower loader section 28 to extend in alignment with one another with the lower end of cargo loader 10 being held above the surface of the ground 22. With upper loader section 26 aligned with lower loader section 28, the two loader sections are locked together by a locking mechanism (not shown in FIG. 14) which will be described relative to FIGS. 20, 21 and 22. Additionally, while the extended cargo loader 10 is supported above the surface of the ground by support cable 92, ground support assembly 36 is moved from the stowage position (folded against the lower surface of lower ramp section 28) to the deployed position in which ground support assembly 36 extends downwardly from the lower end of lower loader section 28. As shall be described relative to FIG. 23, in the currently preferred embodiments of the invention, ground support assembly 36 is rotated into the deployed position by means of a motor driven ball screw assembly that is mounted within sidewalls 50 of lower loader section 28. When ground support assembly 36 has been deployed in the manner indicated in FIG. 14, support cable 92 is extended until wheels 40 of ground support assembly 36 rest on the surface of the ground 12. Staging platform 42 is then swung upwardly into the deployed, substantially horizontal position shown in FIG. 14 and a support rod 158 that is connected to each side of staging platform 42 is inserted in an opening in ground support assembly 36 to maintain staging platform 42 in the deployed position. At this point, cargo loader 10 is fully deployed and is ready for use in the manner depicted in FIG. 1 and described in more detail hereinafter.

Figure 15:
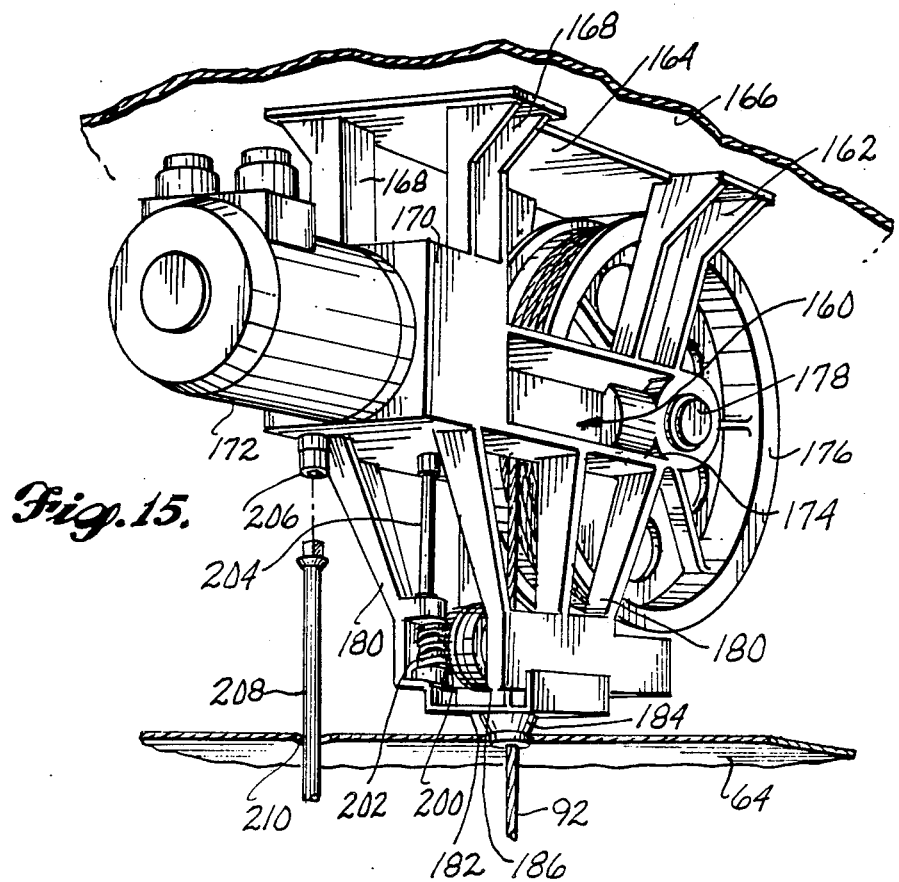
FIG. 15 is a pictorial view depicting a motor driven cable system that is mounted in the ceiling of the cargo compartment and is utilized during deployment and retraction of the cargo loader.
Figure 16:
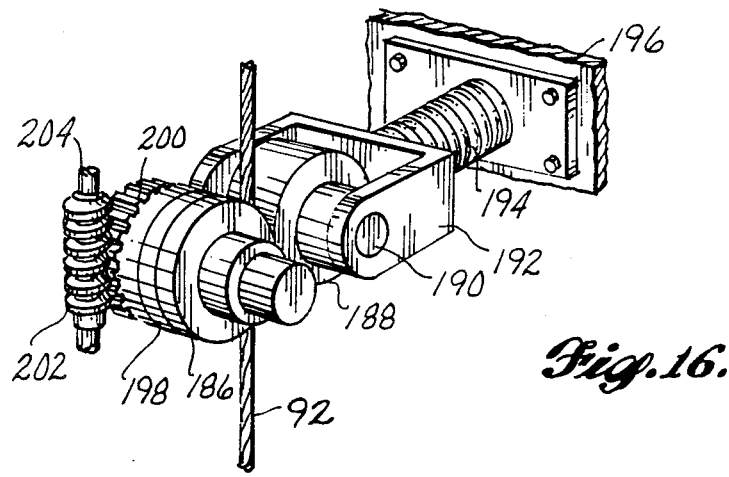
FIG. 16 is an enlarged pictorial view of a cable tension control that is included in the cable drive assembly of FIG. 15.

The cable drive assembly utilized in the above-discussed deployment sequence to pay out and retrieve support cable 92 as cargo loader 10 is lowered from cargo door 18 and deployed is depicted in FIG. 15 and is generally identified by the numeral 160. As is shown in FIG. 15, cable drive assembly 160 includes a mounting frame 162 having a substantially rectangular base plate 164 that is fixed to an upper deck floor 166 or other structure that is located above and spaced apart from cargo compartment ceiling 64. Extending downwardly from one end of base plate 164 are two spaced-apart support channels 168 which interconnect base plate 164 with a substantially rectangular gear housing 170. Extending outwardly from one face of rectangular gear housing 170 is a reversible electrical drive motor 172. Although not specifically illustrated in FIG. 15, the output shaft of drive motor 172 drives a system of reduction gears that are contained within rectangular gear housing 170. Projecting outwardly from the opposite face of gear housing 170 is a pair of horizontally extending, spaced-apart cable drum support arms 174. A cable drum 176 is mounted between the horizontally extending support arms 174 by means of a shaft 178 that passes through the substantially circular bearing housings that are located at the end of each support arm 174. Although not specifically illustrated in FIG. 15, cable drum 176 is rotated by means of an output shaft that extends from gear housing 170 to the central hub of cable drum 176. As is shown in FIG. 15, support frame 162 includes substantially trapezoidal lower support members 180 that extend downwardly from the lower surface of gear box 170 and the horizontally extending cable drum support arms 174. A plate 182 extends between the lower edges of the two lower supports 180. Centrally mounted in plate 182 and extending downwardly through an opening in cargo compartment ceiling 64 is a tapered cylindrical guide 184. As is shown in FIG. 15, support cable 92 is threaded through a central opening in cylindrical guide 184 and extends upwardly and about cable drum 176.

The currently preferred realizations of cable drive system 160 includes means for maintaining cable tension on support cable 92 to ensure that support cable 92 is properly spooled on cable drum 176 in the event that the portion of support cable 92 that extends downwardly from cylindrical guide 184 becomes slack. In the arrangement depicted in FIGS. 15 and 16, support cable 92 passes between two tension wheels 186 and 188 that are mounted above plate 182. As is shown most clearly in FIG. 16, tension wheel 188 is mounted on an axle 190 that passes through the spaced-apart flanges of a U-shaped carrier 192. Extending away from the bottom portion of U-shaped carrier 192 is a rod (not shown in FIG. 16) that passes through a compression spring 194 and through an opening in a crossmember 196 of support frame 160. Compression spring 194 urges carrier 192 and tension wheel 188 toward cable 92, forcing cable 92 into a groove 198 that is circumferentially formed in the central portion of tension wheel 186. As is shown in FIG. 15, tension wheel 186 is mounted for rotation between the trapezoidal lower support members 180. Mounted for rotation with tension wheel 186 is a gear 200, which meshes with a worm gear 202. Worm gear 202 is driven by a shaft 204 that extends downwardly from the reduction gears that are housed in gear housing 170. In this arrangement, worm gear 202 rotates tension wheel 186 at a rate that is substantially equal to the rate at which support cable 92 is payed out and retrieved by cable drum 176, thereby maintaining proper tension on support cable 92.

As also is indicated in FIG. 15, the currently preferred realization of cable drive assembly 160 is configured for manual operation in the event of aircraft power failure or the failure of motor 172. In this regard, the reduction gears contained in gear housing 170 can be manually driven by rotation of a cylindrical drive fitting 206 that extends downwardly from the lower surface of rectangular gear housing 170. To manually drive the reduction gears, a handcrank 208 is inserted through an opening 210 in cargo compartment ceiling 64 to engage the substantially square end of handcrank 208 in a downwardly facing mating recess in the lower face of drive fitting 206.

As was discussed relative to FIGS. 12 and 13, during the steps of the deployment sequence in which lower loader section 28 is swung away from upper loader section 26 and lowered to the surface of the ground, a damper cable 156 that extends between sidewall 50 of upper loader section 26 and the sidewall 50 of lower loader section 28 controls the rate at which lower loader section 28 swings downwardly. As is illustrated in FIGS. 17, 18 and 19, in the currently preferred embodiments of the invention, the rate at which damper cable 156 is extended (and hence the rate at which lower loader section falls downwardly to the ground) is controlled by a motor driven cable drum 212 that is mounted in the interior region of upper loader section 26 and is automatically activated when lower loader section 28 is manually swung into the vertically extending position of FIG. 12. More specifically, in the arrangement shown in FIGS. 17-19, damper cable 156 (which is fastened to sidewall 50 of lower loader section 28) passes along the outer surface of sidewall 50 of upper loader section 26 and is routed between two cable guide sheaves 214 and 216. Cable guide sheaves 214 and 216 are mounted within an opening 217 defined by a cover plate 218 that extends outwardly from sidewall 50 of upper loader section 26 to form a rectangular housing. After passing through cable guide sheaves 214 and 216, damper cable 219 passes around a double sheave pulley 220 that rotates about an axis that is substantially perpendicular to the rotational axis of guide sheaves 214 and 216. As is shown most clearly in FIG. 18, double sheave pulley 220 is mounted for rotation in spaced-apart brackets 222 that are fastened to the inner wall of sidewall 50 and extend laterally across the interior region of sidewall 50. As is indicated in FIG. 17, double sheave pulley 220 causes damper cable 156 to be directed inwardly into the interior of upper loader section 26. In addition, as is indicated in FIGS. 17 and 19, guide pulley 216 maintains damper cable 156 in engagement with double sheave pulley 220 when damper cable 156 does not extend along the longitudinal centerline of sidewall 50 (i.e., when lower loader section 28 is in a fully or partially folded condition).

As is shown in FIGS. 17 and 18, a cylindrical tube 224 is mounted within the interior region of upper loader section 26, with cylindrical tube 224 extending orthogonally from the sidewall 50 that is oppositely disposed to the sidewall 50 that includes double sheave pulley 220. The end of cylindrical tube 224 that is near double sheave pulley 220 is supported by a mounting channel 226 and includes an end plate 228. As can be seen in both FIGS. 17 and 18, damper cable 156 passes through an opening 230 in the lower central portion of end plate 228 and passes along the lower interior region of cylindrical tube 224. Located at the opposite end of cylindrical tube 224 is a pulley block 232 that is attached to sidewall 50 of upper loader section 26 by a spring 236. Damper cable 156 passes about the sheave of pulley block 232 and is routed along the upper interior surface of cylindrical tube 232 so that it emerges from an opening 238 that is in the upper region of end cap 228 and is directly above opening 230.

After passing through end cap 228, damper cable 156 again is directed inwardly toward the center of upper loader section 26 by a pulley 240 that is mounted to the sidewall 50 that includes guide sheaves 214 and 216 and double sheave pulley 220. As is shown both in FIGS. 17 and 18, pulley 240 lies in a plane that is parallel with the upper surface of upper loader section 26 and is mounted between two spaced-apart, inwardly extending mounting flanges 242 that are attached to the inner surface of sidewall 50. After passing about pulley 240, damper cable 156 passes onto cable drum 212, which is centrally mounted within the interior region of upper loader section 26 in alignment with pulley 240. As is shown in FIG. 17, cable drum 212 is mounted between an upwardly extending gear box 242 and an upwardly extending support arm 244. An electric motor 246 is mounted to the opposite side of gear box 242 and drives reduction gears which rotate cable drum 212 at a rate that establishes the speed at which lower loader section 28 falls from the vertical position shown in FIG. 12 to the substantially unfolded condition depicted of FIG. 13 (in which the lower end of lower loader section 28 rests on the surface of the ground 22).

More specifically, when lower loader section 28 is swung away from upper loader section 26 in the manner described relative to FIG. 12, the reduction gears that are contained in gear housing 242 prevent rotation of cable drum 212. Thus, swinging lower loader section 28 away from upper loader section 26 causes tension in damper cable 156 that extends spring 236. As lower loader section 28 reaches a substantially vertical position, pulley block 232 reaches the end of cylindrical tube 224 and depresses a plunger 252 of an electrical switch 248 that is mounted in end cap 228 of cylindrical tube 224. Switch 248 is connected to motor 246 by an electrical cable 250 and, when activated, causes motor 246 to drive cable drum 212 in a direction that dispenses damper cable 156, thereby allowing lower loader section 28 to swing downwardly until the lower end of the lower loader section contacts the surface of the ground (as shown in FIG. 13). When the lower end of lower loader section 26 rests on the surface of the ground, motor 246 continues to rotate cable drum 212 until tension in spring 236 pulls pulley block 233 away from plunger 252 of switch 248. Spring 236 then maintains damper cable 156 under tension when upper loader section 26 and lower loader section 28 are aligned with one another and locked together in the manner discussed relative to FIG. 14.

FIGS. 20-22 illustrate the manner in which upper loader section 26 is hinged together with lower loader section 28 and further illustrate the locking mechanism of the currently preferred embodiments of the invention for locking upper loader section 26 in alignment with lower loader section 28 in the manner described relative to FIG. 14. For clarity of illustration, FIG. 20 does not depict conveyor belt 32 and rollers and other components that are mounted within the terminal regions of upper loader section 26 and lower loader sectin 28. The arrangement of these additional components will be discussed relative to FIGS. 26-28.

As is shown in FIGS. 20 and 21, which illustrate upper loader section 26 in alignment with lower loader section 28 (i.e., the fully deployed position), the upper terminal region of each sidewall 50 of upper loader section 26 and lower loader section 28 is smoothly radiused to facilitate hinging of the upper and lower loader sections. Mounted in the interior region of the sidewalls 50 and spanning the juncture between the sidewalls of upper loader section 26 and lower loader section 28 is a pivot block 254. As is shown most clearly in FIG. 22, each pivot block 254 occupies less than one-half the interior width of the associated sidewalls 50 and is positioned within a guide 256 that extends along the interior region of the sidewalls 50. More specifically, each guide 256 includes walls that extend along each interior face of the sidewalls 50. Projecting upwardly from the lower wall of guide 256 is an additional wall 258 that partitions the interior of sidewalls 50 into two channels of approximately equal width. Pivot block 254 is positioned within the channel that is nearest the outside face of the sidewalls 50. Pivot pins 260 pass through openings in the outer wall of each sidewall 50, with each pivot pin being retained in wall 258 of guide 256. A bearing 262, which is recessed into the outside face of pivot block 254, permits each end of each pivot block 254 to rotate about the pivot pins 260, thereby permitting lower ramp section 28 to be swung between the aligned orientation of FIGS. 20 and 21 and the folded condition shown in FIGS. 2-8.

In the arrangement of FIGS. 20 through 22, upper loader section 26 is locked in alignment with lower loader section 28 by locking slides 270 that are arranged for retraction into the interior regions of sidewalls 50 of upper loader section 26 and for extension into the interior regions of sidewalls 50 of lower loader section 28. More specifically, the portion of each locking slide 270 that can be extended into the interior region of an associated sidewall 50 of lower loader section 28 is substantially L-shaped in cross-sectional geometry with the flange region that defines the major leg of the "L" being in juxtaposition with the inner surface of sidewalls 50 of upper loader section 26. A slot 272 extends longitudinally along the lower region of each locking slide 270. As is shown in FIGS. 20 and 21, a guide pin 274 projects outwardly from the inner wall of each sidewall 50 of upper loader section 26 and into slot 272 of the locking slides 270. As is shown most clearly in FIGS. 20, immediately behind the L-shaped region of each locking slide 270 is a region in which the flange that defines the minor leg of the L-shaped geometry and a portion of the flange that defines the major leg of the L-shaped geometry is machined away to form a substantially rectangular extension having gear teeth 276 formed in the upper surface thereof.

In the depicted arrangement, locking slides 270 can be extended (to lock together upper loader section 26 and lower loader section 28) or can be retracted (to permit folding of cargo loader 10) by operation of a motor 278 or, alternatively, by manual operation of a foldable handcrank 280. More specifically, as is shown in FIG. 20, foldable handcrank 280 is pivotably mounted to one end of a shaft 282 that extends through aligned openings in a sidewall 50 of upper loader section 26. A gear 284 that is affixed to shaft 282 is positioned within the interior region of sidewall 50 for engagement with gear teeth 276 of the locking slide 270 nearest to foldable handcrank 280. A gear 286, mounted to the end of shaft 282, is engaged with a worm drive 288. Worm 288 is driven by motor 278 via a gear reducer 290.

A shaft 292 extends between gear 286 and a gear 296 that is meshed with teeth 276 of the locking slide 270 that is mounted in the second sidewall 50 of upper loader section 26. As is indicated in FIG. 20, shaft 292 includes a splined end region 294 that is slidably received in bearing 286. Thus, as is indicated by the double arrow 297 of FIG. 20, pulling outwardly on foldable handcrank 280 disengages gear 286 from worm drive 288 of motor 278. With gear 286 disengaged, handcrank 280 can be operated to simultaneously move the two locking slides 272 along the guides 256 to latch or unlatch upper loader section 26 and lower loader section 28. During normal operation, gear 286 remains engaged with worm drive 288 so that motor 278 operates locking slides 270.

Regardless of whether handcrank 280 or motor 278 is utilized to drive locking slides 270, gears 284 and 296 cause locking slides 270 to slide through the opening defined alongside and above pivot blocks 254 so that the lower end of locking slides 270 can be inserted into and withdrawn from sidewalls 50 of lower loader section 28. When locking slides 270 are fully engaged in sidewalls 50 of lower loader section 28, a semicircular notch 300 that is formed in the lower end of each locking slide engages with a stop pin 298 that is mounted to the inside face of sidewall 50 of lower loader section 28 and projects inwardly into the region formed within sidewall 50 for receiving each locking slide 270.

As previously described, the lower end of lower loader section 28 includes a ground support assembly 36 which is folded against lower loader section 28 when cargo loader 10 is stowed (FIGS. 2 and 4-7) and which is swung downwardly during deployment of cargo loader 10 so that ground support assembly 36 supports the lower end of the deployed cargo loader 10 above the surface of the ground (FIG. 14). As can be seen in FIG. 23, ground support assembly 36 includes a web-like plate 302 having a width that is slightly greater than the overall width of lower loader section 28. Extending orthogonally from each of two oppositely disposed edges of web-like plate 302 are flanges 304, which form legs 38 of ground support assembly 36. Each flange 304 includes a substantially circular region that projects beyond the edge of web-like plate 302. A pin 306, which is mounted near the lower terminus of lower loader section 28 and extends outwardly from sidewall 50, passes through an opening in each region of the flanges 304 that projects beyond the edge of web-like plate 302. Pins 306 serve as hinges, which allow ground support assembly to be positioned against lower loader section 28 for stowage of cargo loader 10 and positioned for support of the deployed cargo loader 10.

In the arrangement depicted in FIG. 23, ground support assembly 36 is moved between the stowage and deployed positions by means of a ball screw 310 that extends along the lower face of each sidewall 50 of lower loader section 28. More specifically, the lower end of each ball screw 310 is mounted for rotation in a bearing block 312 that is affixed to the lower face of sidewall 50. Right angle gear drives 314, mounted to the lower face of sidewall 50, are engaged with the upper end of each ball screws 310 with the gear drives 314 being driven by a shaft 316 that extends laterally across the interior region of lower ramp section 28. A gear 318 is affixed to the center of shaft 316. Engaged with gear 318 is a worm drive 320, which is driven by a motor-reduction unit 322.

In operation, motor-reduction drive unit 322 drives shaft 316 which simultaneously rotaotes drive screws 310. As drive screws 310 rotate, drive screw nuts 324, which are engaged with ball screws 310, move toward or away from the lower end of lower loader section 28. As is shown in FIG. 23, each ball screw nut 324 is pivotably attached to a support tube 326. Since the lower end of each support tube 326 is pivotably attached to flanges 304 at a point below the hinges that are formed by pins 306, rotation of ball screws 310 causes ground support assembly 36 to swing about the lower end of lower loader section 28. Thus by selectively activating motor-reduction gear unit 322, ground support assembly 36 can be swung between the previously described stowed and deployed positions.

As also is illustrated in FIG. 23, staging platform 42 is pivotably attached to the lower end of lower loader section 28 and is deployable to form a table like extension of cargo loader 10. More specifically, staging platform 42 includes a substantially planar surface 325 having an edge 327 that is positionable adjacent to the lower end of lower loader section 28. Extending downwardly from each of the two oppositely disposed edges of planar region 325 that are orthogonal to edge 327 is a flange 329. Each flange 329 includes a region that extends beyond edge 327 for pivotable attachment to pins 306. When ground support assembly 36 has been extended to support the lower end of cargo loader 10, staging platform 42 is swung upwardly into the position depicted in FIG. 23. Staging platform 42 is maintained in the deployed position by support rods 158 which have one end thereof pivotably attached to the oppositely disposed flanges regions of ground support assembly 36 and the second thereof inserted in an opening 328 of flange region 329 of staging platform 42.

FIGS. 23 through 29 illustrate the construction of conveyor belt 32 and depict various features of cargo loader 10 that relate to the operation of conveyor belt 32. Referring first to FIG. 23, the lower terminus of lower loader section 28 includes a conveyor roller 330 which extends between the inner faces of the oppositely disposed sidewalls 50 of lower loader section 28. Formed in the surface of conveyor roller 330 are five spaced-apart circumferential grooves 332. The three grooves 332 that are located in the central portion of conveyor roller 330 provide guides for hereinafter-described alignment strips that project inwardly from the inner surface of conveyor belt 32. The two grooves 332 that are located near the ends of conveyor roller 330 provide guides for T-shaped strips that also extend inwardly from the inside surface of conveyor belt 32 and are utilized to facilitate folding of conveyor belt 32 at the juncture between upper loader section 26 and lower loader section 28 when cargo loader 10 is folded for stowage.

With continued reference to FIG. 23, each end of conveyor roller 330 is rotatably received by a belt tightener assembly 334 that is contained within the interior region of a sidewall 50 of lower loader section 28. In the depicted arrangement, each belt tightener assembly 334 includes a rectangular block 336 that is affixed to the interior walls of sidewall 50. Extending from each rectangular block 336 are two spaced-apart threaded rods 338 that are substantially parallel to one another and extend along the interior of sidewall 50 toward conveyor roller 330. Slidably received on the threaded, spaced-apart rods 338 is a slider block 340, which includes a guide rod 342 that extends through an opening in the central portion of rectangular block 336. Mounted on the face of slider block 340 that faces the lower end of lower ramp section 28 is a bearing block 344 which receives a shaft 346 that is formed in the end of conveyor roller 330 and projects inwardly into sidewall 50. In this arrangement, jam nuts that are threadably engaged with threaded rods 338 and positioned at each face of slider block 340 are rotated to control the tension exerted on conveyor belt 32.

FIGS. 24 and 25 illustrate a power roller system that is located at the upper end of upper loader section 26 for driving conveyor belt 32. As is illustrated in FIG. 24, in this arrangement, a power roller 350 extends laterally across the upper end of upper loader section 26, with each end of power roller 350 passing into a circular opening 352 in an end cap 354 that extends from the end of each sidewall 50 of upper loader section 26. A bearing (not shown in FIG. 24) circumferentially surrounds the portion of power roller 350 that extends inwardly into each circular opening 352 to permit power roller 350 to rotate about its longitudinal axis. A tension rod 358 extends through a central opening within power roller 350, with threaded end portions of tension rod 358 projecting through a central opening of a circular plate 360 that is positioned in each circular opening 352. Nuts 362, threadably engaged with the ends of tension rod 358, force the circular disks 360 into abutment with shoulders 356 that are formed within openings 352, thereby rigidly connecting the upper ends of sidewalls 50 of upper loader section 26. A series of spaced-apart threaded holes 361 circumferentially surround circular opening 352 to provide for the mounting of deployment fittings 88 and 90 (shown in FIG. 8).

Power roller 350 is driven by two V-belts 364 that include uniformly spaced-apart teeth that project inwardly from the inner surface thereof. As is shown in FIG. 24, the V-belts 364 engage with teeth that are formed in the lower surface of spaced-apart recesses 366 that are included in the central portion of power roller 350. Drive wheels 368 having outwardly extending teeth that engage with the V-belts 364 are mounted at the ends of a shaft 370. Shaft 370 rotates within three spaced-apart sleeve bearings 372 that are contained within flanged bearing housings 374 which are affixed to upper and lower L-shaped crossmembers 376 that are parallel to one another and extend transversely between the oppositely disposed sidewalls 50 of upper loader section 26. A gear 378, which is mounted for rotation with shaft 370, is engaged with a worm gear 380 of a motor unit 382. In the arrangement of FIGS. 24 and 25, motor unit 382 is mounted to the lower crossmember 376 and includes two motors 384 and 386 that drive worm gear 380 via a reduction unit 388. With this arrangement, a conventional switch (not shown in FIGS. 24 and 25) can be utilized to alternate between motors 384 and 386 each time power is supplied to the conveyor drive system. Alternatively, one of the motors 384 and 386 can be used to drive power roller 350, with the second motor being utilized as a spare. As also is shown in FIGS. 24 and 25, a circumferential recess in the center of power roller 350 is journaled in a pillow block 392. As is illustrated in FIG. 25, pillow block 392 is fastened to a trapezoidal mount 391 that extends forwardly from spaced-apart upper and lower crossmembers 376.

With reference to FIG. 24, the inner surface of conveyor belt 32 includes three longitudinally extending, spaced-apart alignment strips 394 that project inwardly. In the arrangement shown, each alignment strip 394 includes a plurality of inwardly extending ridges, causing the alignment strips to have a tooth-like cross-sectional geometry. As also is shown in FIG. 24, the alignment strips 394 pass through the grooves 364 and the groove 390 of power roller 350 to thereby maintain conveyor belt 32 in proper alignment with power roller 350. As was described relative to FIG. 23, at the lower end of lower loader section 28, the alignment strips 394 project inwardly into the three centrally located grooves 332 of conveyor roller 330 to maintain conveyor belt 32 in alignment with conveyor roller 330.

Located near each edge of conveyor belt 32 and extending inwardly from the inner surface thereof is a T-shaped strip 396. Each T-shaped strip 396 passes into a circumferentially extending groove 398 of power roller 350 as conveyor belt 32 passes around power roller 350. Although T-shaped strips 396 assist in maintaining conveyor belt 32 aligned with power roller 350 and conveyor roller 330 (FIG. 23), the primary function of T-shaped strips 396 is to maintain conveyor belt 32 in contact with the upper surfaces of upper loader section 26 and lower loader section 28 when cargo loader 10 is folded for stowage.

More specifically, as is shown in FIGS. 26 through 28, T-shaped strips 396 pass through retaining guides 400 that are mounted near the ends of upper loader section 26 and lower loader section 28. As is shown most clearly in FIG. 26, each retaining guide 400 includes a mounting bracket 402 having an upper surface that extends inwardly from the sidewall 50 of upper loader section 26 (or lower loader section 28) and includes flanges that are orthogonal to the upper surface and extend downwardly along sidewalls 50. In the depicted arrangement, a first set of three spaced-apart retaining wheels 404 is mounted for rotation on the upper surface of mounting bracket 402 with the first set of retaining wheels being positioned to project into the groove-like space defined between the lower surface of conveyor belt 32 and the portion of conveyor belt 32 that defines the crossmember of T-shaped strip 396. A second set of three spaced-apart retaining wheels 404 is mounted on the upper surface of mounting bracket 402 to project into the groove-like region on the opposite side of T-shaped strip 396. As is shown in FIG. 27, each retaining wheel 404 is pivotably mounted to a spacer strip 406 which positions the mounting wheels above the surface of mounting bracket 402. Conventional fasteners such as machine screws 408 and nuts 410 of FIG. 27 securely fasten spacer strips 406 to the upper surface of mounting bracket 402. To facilitate removal of conveyor belt 32, the fasteners that secure one or both of the spacer strips 406 to mounting bracket 402 pass through slots 412 that extend orthogonally away from T-shaped strip 396.

As is shown in FIG. 28, retaining guides 400 operate in conjunction with the previously mentioned rollers 72 and 74 (FIG. 2) to maintain relatively constant tension on conveyor belt 32 both when cargo loader 10 is fully extended and when cargo loader 10 is folded for stowage. More specifically, in the depicted arrangement, conveyor belt 32 passes beneath a relatively large diameter roller 72 that extends between sidewalls 50 of upper loader section 26 at a position spaced away from the end of upper loader section 26. In a similar manner, conveyor belt 32 passes beneath a relatively large diameter roller 72 that extends between sidewalls 50 of lower loader section 28 at a position that is spaced apart from the upper end of lower loader section 28. Immediately after passing over roller 72 of upper loader section 26, conveyor belt 32 is routed upwardly to pass over a smaller diameter roller 74 that is mounted between sidewalls 50 of upper loader section 26 at a position near the lower end of upper loader section 26. A roller 74 also extends between sidewalls 50 of lower loader section 28 at a position that is near the upper end of lower loader section 28 and near the upper surface thereof. Thus, as is shown by solid lines in FIG. 28, the lower surface of conveyor belt 32 is maintained substantially parallel to and closely spaced apart with the upper surface of conveyor belt 32 throughout the portion of upper loader section 26 and lower loader section 28 that extends between rollers 74. As is shown by phantom lines in FIG. 28, when lower loader section 28 is swung about pivot blocks 254 (FIG. 20) during deployment or retraction of cargo loader 10, the retaining guides 400 control the radius of curvature of the upper surface of conveyor belt 32 to maintain conveyor belt 32 in substantial contact with the upper surface of cargo loader 10. In conjunction therewith, the routing of the lower surface of cargo loader 10 that is effected by rollers 72 and 74 allows cargo loader 10 to be folded and unfolded without substantially changing the tension on conveyor belt 32.

FIG. 29 illustrates one manner in which rollers 74 can be installed in upper loader section 26 and lower loader section 28 to permit the rollers 74 to be easily removed from service operations such as the replacement of conveyor belt 32. In the arrangement shown in FIG. 29, a bore 414 extends inwardly from the end of roller 74 along the axial centerline of the roller. A guide pin 416 projects outwardly from the lower surface of bore 414, extending along the axial centerline of roller 74 and bore 414 to a position near the circular opening defined by bore 414. In addition, a cylindrical plunger 418 extends outwardly from bore 414, with the end region of plunger 418 being of a reduced diameter. A spring 420 is located between the end surface of bore 414 and the inward end of plunger 418 with spring 420 coaxially surrounding guide pin 416. When roller 74 is properly positioned between sidewalls 50 of upper loader section 26 or lower loader section 28, spring 420 urges plunger 418 outwardly so that the reduced diameter end region of plunger 418 is engaged in a suitably-sized opening in the wall of sidewall 50. As is indicated by arrow 422 in FIG. 29, each roller 74 can be removed by inserting the shaft of a screwdriver or similar tool through an opening 424 in the outer wall of sidewall 50 to depress plunger 418.

Based on the above description of the invention, it can be recognized that a deployed cargo loader 10 can be quickly removed from the aircraft in the event of an emergency and, further, if the aircraft electrical power system fails while cargo loader 10 is deployed, a manual retraction sequence can be executed.

FIGS. 30a–30d illustrate the procedure for quickly removing cargo loader 10 from the aircraft, with FIG. 30a depicting cargo loader 10 fully deployed in the manner previously discussed with respect to FIG. 14. In the first step of the procedure, which is illustrated in FIG. 30b, cargo handler 48 (or another member of the ground crew) reaches outwardly through cargo opening 18 to grasp support cable 92 and disconnect cable release mechanism 93. At the same time, cargo handler 46 (or another member of t he ground crew) firmly grasps staging platform 42. As is indicated in FIG. 30c, cargo handler 48 then removes the pins 60 that secure the horizontal leg of L-shaped deployment track 30 to the deck 56 of cargo compartment 18 (shown in FIG. 3). As is illustrated in FIG. 30d, cargo handler 46 then pulls cargo loader 10 outwardly away from cargo opening 18, which permits the upper end of cargo loader 10 (including L-shaped deployment fitting 30) to fall to the ground. As the same time, cargo handler 48 activates the aircraft power assisted door drive system to close cargo door 20.

FIGS. 31a through 31e illustrate a manual sequence for retraction and stowage of cargo loader 10 in the event of failure of the aircraft electrical power system. As is shown in FIG. 31a, in the first step of the sequence, a cargo handler 48 (or another member of the ground crew) engages the end of a handcrank 208 with the drive fitting 206 of FIG. 15 by inserting the handcrank 208 in the opening 210 of ceiling 64 (FIG. 15). Cargo handler 48 then rotates handcrank 208 to raise cargo loader 10 with support cable 92. when ground support assembly 36 clears the surface of the ground 22, cargo handler 46 (or another member of the ground crew) swings ground support assembly 36 and staging platform 42 against the lower surface of lower ramp section 28. As is indicated in FIG. 31b, with upper loader section 26 and lower loader section 28 in alignment with one another (i.e., cargo loader 10 fully extended), cargo handler 46 operates handcrank 280 of FIG. 20 to retract locking slides 270 of FIG. 20 so that lower loader section 28 is free to swing upwardly about the interconnection with upper loader section 26.

As is shown in FIG. 31c, cargo handler 48 next operates handcrank 208 to lower cargo ramp 10 so that the lower end of lower loader section 26 rests on the surface of the ground 22 and cargo ramp 10 assumes a partially folded condition. During this step, cargo handler 48 operates handcrank 208 to pay-out additional cable which cargo handler 46 loops around a small drum-like lift fixture that is located near the lower end of lower loader section 28 and projects outwardly from sidewall 50 of lower loader section 28. As is shown in FIG. 31d, when cargo handler 46 has looped cable 92 around the lift fixture, cargo handler 48 operates handcrank 208 to swing lower loader section 28 upwardly about the juncture between upper loader section 26 and lower loader section 28. As is indicated by the phantom lines in FIG. 31d, cargo handler 48 ceases operation of handcrank 208 when lower loader section 26 reaches a substantially vertical condition. At this point, lower loader section 28 is manually pushed toward cargo compartment 12 so that cargo ramp 10 is completely folded and extends downwardly from cargo opening 18. Cargo handler 48 then operates handcrank 208 to raise the folded cargo ramp 10 until it is substantially horizontal (as shown in phantom lines in FIG. 31e).

As is shown in FIG. 31e, cargo handler 48 then inserts the handcrank 208 into the manual drive mechanism of L-shaped deployment track 30. As was described relative to FIGS. 8 and 9, manual operation of handcrank 208 drives ball screw 98 to cause the upper end of the folded cargo ramp 10 to travel upwardly along the vertical leg of L-shaped deployment fitting 30 so that the folded cargo ramp 10 is swung into a position in which it is substantially vertical and projects outwardly from cargo opening 18 (the position shown in FIG. 6). The folded cargo loader 10 is then swung inwardly by means of ratchet arm 146 (described relative to FIGS. 8 and 9) until the vertically-positioned folded cargo ramp 10 extends laterally across cargo opening 18 (as shown in FIG. 4). Cargo door 20 is then closed utilizing the associated aircraft power-assisted door drive system. After closing cargo door 20, the horizontal leg of L-shaped deployment fitting 30 is interconnected with door-mounted stowage fittings 54 in the manner described relative to FIG. 3. The folded cargo loader 10 is then swung against the interior surface of cargo door 20, with the upper end of the vertically extending leg of L-shaped deployment fitting 30 being secured in socket fitting 52.

Although the invention is described and illustrated herein by reference to the currently preferred embodiments, it should be understood that various substitutions, modifications and alterations can be made without departing from the scope and spirit of the invention. For example, various changes can be made in the motor driven and manual systems for moving folded cargo ramp 10 along the L-shaped deployment track 30 and, in a similar manner, various modifications and changes can be made in other components such as the locking mechanism for retaining upper loader section 26 and lower loader section 28 in alignment with one another.

The embodiments of the invention in which an exclusive property or privilege is claimed are defined as follows:

1. An aircraft cargo loader stowable in a folded condition along the inside surface of an aircraft cargo door and deployable through the cargo opening of an aircraft to extend between the aircraft cargo compartment and the surface of the ground, said aircraft cargo loader comprising:

an upper and lower loader section, said upper and lower loader sections each being substantially rectangular in geometry with a first end of said upper loader section being hinged to a first end of said lower loader section to permit said lower loader section to be swung between a folded condition in which said lower loader section is in superposition with said upper loader section and an extended condition in which said lower loader section extends in axial alignment with said upper loader section;

an L-shaped deployment track having a first leg adapted to be temporarily secured to the floor of said cargo compartment in front of said cargo opening when said cargo loader is to be deployed, said L-shaped deployment track having a second leg that is substantially vertical when said first leg is secured to said floor of said cargo compartment; and first cargo loader deployment means operatively connected between a second end of said upper loader section and said L-shaped deployment track for selectively positioning said cargo loader in a first position in which said lower loader section is in said folded condition and said second end of said upper loader section is in spaced-apart juxtaposition with said first leg of said L-shaped deployment track and a second position in which said second end of said upper loader section is in spaced-apart juxtaposition with said second leg of said L-shaped deployment track, said first cargo loader deployment means including means for permitting swinging movement of said cargo loader about said second end of said upper loader section to permit said cargo loader to be swung outwardly through said cargo door when said lower loader section is in said folded condition and said cargo loader is in said second position and to permit swinging movement of said cargo loader away from and toward said surface of said ground when said cargo loader is in said first position and said cargo loader is extended through said cargo opening.

2. The aircraft cargo loader of claim 1 wherein said first deployment means further includes drive means for moving said cargo loader between said first and second positions.

3. The aircraft cargo loader of claim 2 wherein said drive means of said first deployment means includes a ball screw extending along said first leg of said L-shaped deployment track and wherein said first deployment means is connected to said L-shaped deployment track by a deployment fitting and by a follower arm assembly, said deployment fitting being in threaded engagement with said ball screw and interconnecting one corner of said second end of said upper loader section to said first leg of said L-shaped deployment fitting, said follower arm assembly interconnecting a second corner of said second end of said upper loader section with said second leg of said L-shaped deployment track, said deployment fitting being urged along said first leg of said L-shaped deployment track to move said cargo loader between said first and second positions when said ball screw is rotated, said follower arm assembly guiding said cargo loader along said second leg of said L-shaped deployment track as said cargo loader is moved between said first and second positions.

4. The aircraft cargo loader of claim 1, 2 or 3 further comprising a conveyor system for moving cargo items between said cargo compartment and the surface of the ground when said cargo loader is deployed, said conveyor system including:

a plurality of rollers mounted to said upper and lower loader sections, the rollers of said plurality of rollers being spaced apart from one another and being substantially parallel with the first and second ends of said upper and lower loader sections;

an endless conveyor belt routed by said plurality of rollers to extend from said second end of said upper loader section to second end of said lower loader section; and conveyor drive means for moving said endless conveyor belt about the path defined by said plurality of rollers, a portion of said plurality of rollers being positioned to place upper and lower faces of said endless conveyor belt in close proximity to one another within the region of hinged interconnection between said first end of said upper loader section and said first end of said lower loader section.

5. The aricraft cargo loader of claim 4 wherein two edge regions of an inner surface of said endless conveyor belt each include an inwardly projecting T-shaped strip that extends longitudinally about said endless conveyor belt, the vertical leg of each said T-shaped strip being substantially perpendicular to said inner surface of said endless conveyor belt, the horizontal leg of each said t-shaped strip being substantially parallel to said inner surface of said endless conveyor belt and wherein said first end of said upper loader section and said first end of said lower loader section include retaining means for engagement with said T-shaped strips that project inwardly from the edge regions of said loader section.

6. The aircraft cargo loader of claim 5 wherein each of said retaining means includes two sets of retaining wheels mounted to rotate about axes that are substantially perpendicular to said upper face of said endless conveyor belt, the first set of retaining wheels being positioned to project inwardly into the recess formed between one side of said T-shaped strip and said inner surface of said endless conveyor belt, the second set of retaining wheels being positioned to project inwardly into the recess formed between the other side of said T-shaped strip and said inner surface of said endless conveyor belt.

7. The aircraft cargo loader of claim 6 wherein said inner surface of said endless conveyor belt further includes a plurality of inwardly projecting alignment strips that are spaced apart from one another and that extend about said endless conveyor belt and wherein each roller of said plurality of rollers that contacts said inner surface of said endless conveyor belt includes a circumferentially extending recess for receiving each said alignment strip.

8. The aircraft cargo loader of claims 1, 2 or 3 further comprising locking means for securing said cargo loader in a deployed condition with said upper and lower loader sections in axial alignment with one another.

9. The aircraft cargo loader of claim 8 wherein said upper and lower loader sections each include first and second spaced-apart tubular sidewall members that define the two sides of said upper and lower loader sections, said first sidewall member of said upper loader section being in axial alignment with said first tubular sidewall member of said lower loader section and said second sidewall member of said upper loader section being in axial alignment with said second sidewall member of said lower loader section when said cargo loader is in said deployed condition and wherein said locking means includes a first locking slide mounted within the interior region of the first tubular member of one of said upper and lower loader sections and includes a second locking slide mounted within the interior region of said second tubular member of one of said upper and lower loader sections, said first locking slide being positionable to occupy at least a portion of the interior region of both said first tubular members of said upper and lower loader sections and being positionable for complete retraction into the interior region of one of said first tubular members of said upper and lower loader sections, said second locking slide being positionable to occupy at least a portion of the interior region of both said second tubular members of said upper and lower loader sections and being positionable for complete retraction into the interior region of one of said second tubular members of said upper and lower loader sections.

10. The aircraft cargo loader of claim 9 wherein said locking means further includes locking slide drive means for simultaneously moving said first and second locking slides between said position in which said first and second locking slides occupy a portion of the interior region of said first and second sidewall members of both said upper and lower loader sections and said position in which said first and second locking slides are fully retracted into the interior region of said first and second sidewall members of one of said upper and lower loader sections.

11. The aircraft cargo loader of claims 1, 2 of 3 further comprising an overhead cable drive assembly mounted in said aircraft cargo compartment at a location above the location at which said L-shaped deployment track is secured to said floor of said cargo compartment, said overhead cable drive assembly including a motor driven cable drum having a support cable wound thereon, said support cable being attachable to said cargo loader for raising and lowering said cargo loader when said cargo loader is deployed through said cargo opening to extend between said aircraft cargo compartment and said surface of the ground.

12. The aircraft cargo loader of claim 11 wherein said cable drive assembly includes manual drive means for operating said motor driven cable drum in the event that the motor for operating said motor driven cable drum is inoperative.

13. The aircraft cargo loader of claim 12 wherein said cable drive assembly further includes means for maintaining tension on said support cable to ensure that said support cable is uniformly spooled on the drum of said motor driven cable drum when said motor driven cable drum is rotated to retrieve said support cable.

14. The aircraft cargo loader of claims 1, 2 or 3 further comprising damping means for controlling the rate at which said lower loader section swings about the hinged interconnection between the first ends of said upper and lower loader section when said lower loader section is swung away from said upper loader section and lowered to the surface of the ground by means of gravitational force.

15. The aircraft cargo loader of claim 14 wherein said damping means includes a motor driven cable drum having a damping cable wound thereon, said motor driven cable drum being mounted in the interior of said upper loader section with said damping cable being routed outwardly to the side of said upper loader section for connection to a point on the side of said lower loader section, said damping means further includes switch means for energizing said motor driven cable drum when said lower loader section is placed in a predetermined position, said motor driven cable drum dispensing said damping cable at a controlled rate when said motor driven cable drum is energized.

16. The aircraft cargo loader of claim 15 wherein said damping means further includes first and second pulleys, a pulley block and a tension spring, said first pulley being mounted to one side of said upper loader section for receiving said damping cable passing from said motor driven cable drum and routing said damping cable toward the second side of said upper loader section, said pulley block being connected to said second side of said upper loader section by means of said tension spring and being positioned for receiving said damping cable passing from said first pulley, said pulley block rerouting said damping cable toward said first side of said upper loader section, said second pulley being mounted to said first side of said upper loader section for receiving said damping cable passing from said pulley block and for routing said damping cable along said first side of said upper loader section for connection with said lower loader section, said switch means being mounted in alignment with said pulley block and including a depressible actuator for energizing said motor controlled cable drum, said pulley block being adapted for depressing said actuator when tension in said damping cable that is caused by swinging said lower loader section about said hinged interconnection between said first ends of said upper and lower loader sections extends said tension spring to a point at which said pulley block contacts said depressible actuator of said switch means.

17. The aircraft cargo loader of claims 1, 2 or 3 further comprising a ground support assembly pivotably attached to the second end of said lower loader section for supporting said second end of said lower loader section above said surface of the ground when said cargo loader is deployed to extend from said cargo compartment to said surface of the ground, said ground support assembly being adapted for swinging into juxtaposition with the lower end region of said lower loader section when said cargo loader is in said folded condition.

18. The aircraft cargo loader of claim 17 further comprising drive means for swinging said ground support assembly from a position in which said ground support assembly extends angularly away from said lower loader section to support said second end of said lower loader section above the surface of the ground and a position in which said ground support assembly is in juxtaposition with said lower end region of said lower loader section.

* * * * *